United States Patent
Shim et al.

(10) Patent No.: US 11,231,622 B2
(45) Date of Patent: Jan. 25, 2022

(54) OPTICAL FILM AND DISPLAY DEVICE INCLUDING THE SAME

(71) Applicant: Samsung Display Co., Ltd., Yongin-Si (KR)

(72) Inventors: Sung-Kyu Shim, Seoul (KR); Seong-Yong Hwang, Hwaseong-si (KR); Dohun Kim, Suwon-si (KR); Jonghwan Kim, Busan (KR); Juyoun Son, Cheonan-si (KR); Young-keun Lee, Suwon-si (KR); Seoungbum Pyoun, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/004,308

(22) Filed: Aug. 27, 2020

(65) Prior Publication Data
US 2021/0132447 A1    May 6, 2021

(30) Foreign Application Priority Data
Oct. 31, 2019   (KR) .......................... 10-2019-0137324

(51) Int. Cl.
*G02F 1/13363* (2006.01)

(52) U.S. Cl.
CPC .............................. *G02F 1/133632* (2013.01)

(58) Field of Classification Search
CPC ......... G02F 1/133632; G02F 1/133507; G02F 1/1335; G02B 5/201
See application file for complete search history.

(56) References Cited

U.S. PATENT DOCUMENTS

| 9,874,666 | B2 | 1/2018 | Lee et al. | |
|---|---|---|---|---|
| 2018/0045876 | A1* | 2/2018 | Lee | G02F 1/133528 |
| 2019/0391318 | A1 | 12/2019 | Lee et al. | |
| 2020/0124909 | A1* | 4/2020 | Ueba | G02B 27/0955 |

FOREIGN PATENT DOCUMENTS

| JP | WO-2018194114 A1 * | 10/2018 | ............. G02B 30/27 |
|---|---|---|---|
| KR | 1020150018694 A | 2/2015 | |
| KR | 20150108212 A * | 9/2015 | ............... F21K 9/68 |
| KR | 101871552 B1 | 6/2018 | |
| KR | 101871573 B1 | 6/2018 | |
| KR | 1020190087914 A | 7/2019 | |

* cited by examiner

*Primary Examiner* — Donald L Raleigh
(74) *Attorney, Agent, or Firm* — Cantor Colburn LLP

(57) ABSTRACT

An optical film includes a first pattern layer including a base part and a plurality of protruding parts disposed on the base part, and having a first refractive index, and a second pattern layer disposed on the first pattern layer and having a second refractive index greater than the first refractive index. Each of the protruding parts includes a bottom surface adjacent to the base part, an upper surface opposite to the bottom surface and parallel to the bottom surface, and a side surface disposed between the bottom surface and the upper surface. The side surface includes three or more sub-inclined surfaces, inclination angles of which are different from each other, or includes a curved surface which is convex in a direction of the second pattern layer.

28 Claims, 12 Drawing Sheets

OPTICAL FILM AND DISPLAY DEVICE INCLUDING THE SAME

This application claims priority to Korean Patent Application No. 10-2019-0137324, filed on Oct. 31, 2019, and all the benefits accruing therefrom under 35 U.S.C. § 119, the content of which in its entirety is herein incorporated by reference.

BACKGROUND

1. Field

The present disclosure relates to an optical film and a display device including the optical film, and more particularly, to an optical film including a two pattern layers having different refractive indexes from each other, and a liquid crystal display device including the optical film.

2. Description of the Related Art

Various types of display device are widely used in various field to provide image information. Among various types of display device, a liquid crystal display device is widely applied to a large display device, a mobile display device, or the like due to desired characteristics such as low power consumption.

A liquid crystal device provides light emitted from a backlight part to a liquid crystal display panel and displays an image. In addition, the liquid crystal device additionally includes optical films having various functions in the outside of the liquid crystal display panel to improve display quality.

SUMMARY

The disclosure provides an optical film for improving lateral viewing angle characteristics of a display device.

The disclosure also provides a display device having improved lateral viewing angle characteristics by optimizing the shape of a pattern layer in an optical film.

In an embodiment of the invention, an optical film includes: a first pattern layer including a base part and a plurality of protruding parts disposed on the base part, where the first pattern layer has a first refractive index; and a second pattern layer disposed on the first pattern layer, where the second pattern layer has a second refractive index greater than the first refractive index. In such an embodiment, each of the protruding parts includes: a bottom surface adjacent to the base part; an upper surface opposite to the bottom surface and parallel to the bottom surface; and a side surface disposed between the bottom surface and the upper surface. In such an embodiment, the side surface includes n sub-inclined surfaces, inclination angles of which are different from each other, or includes a curved surface which is convex in a direction of the second pattern layer, where each of the inclination angles of the n sub-inclined surfaces is an acute angle thereof with respect to the bottom surface, and n is an integer of 3 or greater.

In an embodiment, a first inclination angle of a first sub-inclined surface adjacent to the base part among the n sub-inclined surfaces may be greater than a second inclination angle of a second sub-inclined surface which is more distant from the base part than the first sub-inclined surfaces is.

In an embodiment, the inclination angle of a sub-inclined surface connected to the base part among the n sub-inclined surfaces may be in a range of about 85 degrees to about 90 degrees.

In an embodiment, on a cross-sectional surface vertical to the base part, a ratio of a width of the upper surface to a width of the bottom surface may be in a range of about 0.35 to about 0.50.

In an embodiment, the protruding parts may extend in a first direction and be arrayed to be spaced apart from each other in a second direction which is orthogonal to the first direction.

In an embodiment, a pitch of the arrayed protruding parts may be in a range of about 10 micrometers ($\mu$m) to about 100 $\mu$m.

In an embodiment, on a cross-sectional surface vertical to the base part, a separation interval of neighboring protruding parts and the width of the bottom surface may satisfy the following inequality: $0.4 \times W_P \leq W_{DS} \leq 0.7 \times W_P$, where $W_{DS}$ denotes the width of the bottom surface, and $W_P$ denotes the separation interval obtained by adding the width of the bottom surface and a minimum distance between the neighboring protruding parts, which are distances in the second direction.

In an embodiment, on a cross-sectional surface vertical to the base part, a separation interval of neighboring protruding parts and a height of each of the protruding parts satisfy the following inequality: $H_{EP}/W_P \geq 0.8$, where $W_P$ denotes the separation interval obtained by adding the width of the bottom surface and a minimum distance between the neighboring protruding parts, which are both distances in the second direction, and $H_{EP}$ denotes the height which is a minimum distance between the bottom surface and the upper surface.

In an embodiment, on a cross-sectional surface vertical to the base part, a separation interval of neighboring protruding parts and a radius of curvature of the curved surface satisfy the following inequality: $1.5 \times W_P \leq R \leq 4.0 \times W_P$, where $W_P$ denotes the separation interval obtained by adding the width of the bottom surface and a minimum distance between the neighboring protruding parts, which are distances in the second direction, and R denotes the radius of curvature of the curved surface.

In an embodiment, on a cross-sectional surface vertical to the base part, lengths of inclined sides of the n sub-inclined surfaces may be identical to each other.

In an embodiment, each of the protruding parts may include n sub-protruding parts, a width of a sub-bottom surface of an m-th sub-protruding part may be identical to a width of a sub-upper surface of an (m−1)-th sub-protruding part, and m may be an integer greater than or equal to 2 and less than or equal to n.

In an embodiment, a ratio of a height of the m-th sub-protruding part to a height of the (m−1)-th sub-protruding part may be in a range of about 0.8:1 to about 1:1, and each of the height of the m-th sub-protruding part and the height of the (m−1)-th sub-protruding part may be a minimum distance between a sub-bottom surface and a sub-upper surface thereof.

In an embodiment, the side surface includes n sub-inclined surfaces having different inclination angles from each other, each of the protruding parts may include n sub-protruding parts, and, on a cross-section vertical to the base part, each of the n sub-protruding parts may have a trapezoidal shape.

In an embodiment, the curved surface may have a radius of curvature in a range of about 40 $\mu$m to about 120 $\mu$m.

In an embodiment, the side surface may include: a lower sub-side surface connected to the bottom surface and having an inclination angle in a range of about 85 degrees to about 90 degrees with respect to the bottom surface; and a sub-curved surface disposed between the lower sub-side surface and the upper surface, where the sub-curved surface may be convex in a direction of the second pattern layer.

In an embodiment, a difference between the first refractive index and the second refractive index may be about 0.1 or greater.

In an embodiment of the invention, an optical film includes: a first pattern layer including a base part and a plurality of protruding parts disposed on the base part, where the protruding parts have a first refractive index; and a second pattern layer disposed on the first pattern layer, where the second pattern layer has a second refractive index greater than the first refractive index. In such an embodiment, each of the protruding parts includes: a bottom surface adjacent to the base part; an upper surface opposite to the bottom surface and parallel to the bottom surface; and a side surface disposed between the bottom surface and the upper surface. In such an embodiment, the side surface includes n sub-inclined surfaces, inclination angles of which are different from each other, or is a curved surface which is convex in a direction of the second pattern layer, each of the inclination angles of the n sub-inclined surfaces is an acute angle thereof with respect to the bottom surface, and n is an integer of 3 or greater. In such an embodiment, on a cross-section vertical to the base part, a ratio of a width of the upper surface to a width of the bottom surface is in a range of about 0.35 to about 0.5.

In an embodiment, an inclination angle of a sub-inclined surface connected to the base part among the n sub-inclined surfaces may be in a range of about 85 degrees to about 90 degrees.

In an embodiment, on a cross-sectional surface vertical to the base part, a separation interval between neighboring protruding parts and a width of the bottom surface may satisfy the following inequality: $0.4 \times W_P \leq W_{DS} \leq 0.7 \times W_P$, where $W_{DS}$ denotes the width of the bottom surface, and $W_P$ denotes the separation interval obtained by adding the width of the bottom surface and a minimum distance between the neighboring protruding parts, which are distances in the second direction.

In an embodiment, on a cross-sectional surface vertical to the base part, a separation interval of neighboring protruding parts and a radius of curvature of the curved surface may satisfy the following inequality: $1.5 \times W_P \leq R \leq 4.0 \times W_P$, where $W_P$ denotes the separation interval obtained by adding the width of the bottom surface and a minimum distance between the neighboring protruding parts, which are distances in the second direction, and R denotes the radius of curvature of the curved surface.

In an embodiment, on a cross-sectional surface vertical to the base part, each of the protruding parts may have a shape symmetric to an imaginary line passing through a center and extending in a thickness direction.

In an embodiment, on a cross-sectional surface vertical to the base part, the inclination angles of the n sub-inclined surfaces may decrease, as the n sub-inclined surfaces become more distant from the base part.

In an embodiment, each of the protruding parts may have a stripe shape extending in a predetermined direction.

In an embodiment of the invention, a display device includes: a liquid crystal display panel; and an optical film disposed in an upper side of the liquid crystal display panel. In such an embodiment, the optical film includes: a first pattern layer including a base part and a plurality of protruding parts disposed on the base part, where the first pattern layer has a first refractive index; and a second pattern layer disposed on the first pattern layer, where the second pattern layer has a second refractive index greater than the first refractive index. In such an embodiment, each of the protruding parts includes: a bottom surface adjacent to the base part; an upper surface opposite to the bottom surface and parallel to the bottom surface; and a side surface disposed between the bottom surface and the upper surface. In such an embodiment, the side surface includes n sub-inclined surfaces, inclination angles of which are different from each other, or includes a curved surface which is convex in a direction of the second pattern layer, where each of the inclination angles of the each of the sub-inclined surfaces of the n sub-inclined surface is an acute angle thereof with respect to the bottom surface, and n is an integer of 3 or greater.

In an embodiment, a first inclination angle of a first sub-inclined surface adjacent to the base part among the n sub-inclined surfaces may be greater than a second inclination angle of a second sub-inclined surface which is more distant from the base part than the first sub-inclined surface is.

In an embodiment, an inclination angle of a sub-inclined surface connected to the base part among the n sub-inclined surfaces may be in a range of about 85 degrees to about 90 degrees.

In an embodiment, on a cross-sectional surface vertical to the base part, a ratio of a width of the upper surface to a width of the bottom surface may be in a range of about 0.35 to about 0.5.

In an embodiment, on a cross-sectional surface vertical to the base part, a separation interval between neighboring protruding parts among the protruding parts and the width of the bottom surface may satisfy the following inequality: $0.4 \times W_P \leq W_{DS} \leq 0.7 \times W_P$, where $W_{DS}$ denotes the width of the bottom surface, and $W_P$ denotes the separation interval obtained by adding the width of the bottom surface and a minimum distance between the neighboring protruding parts, which are distances in the second direction.

In an embodiment, on a cross-sectional surface vertical to the base part, a separation interval between neighboring protruding parts among the protruding parts and a radius of curvature of the curved surface may satisfy the following inequality: $1.5 \times W_P \leq R \leq 4.0 \times W_P$, where $W_P$ denotes the separation interval obtained by adding the width of the bottom surface and a minimum distance between the neighboring protruding parts, which are distances in the second direction, and R denotes the radius of curvature of the curved surface.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
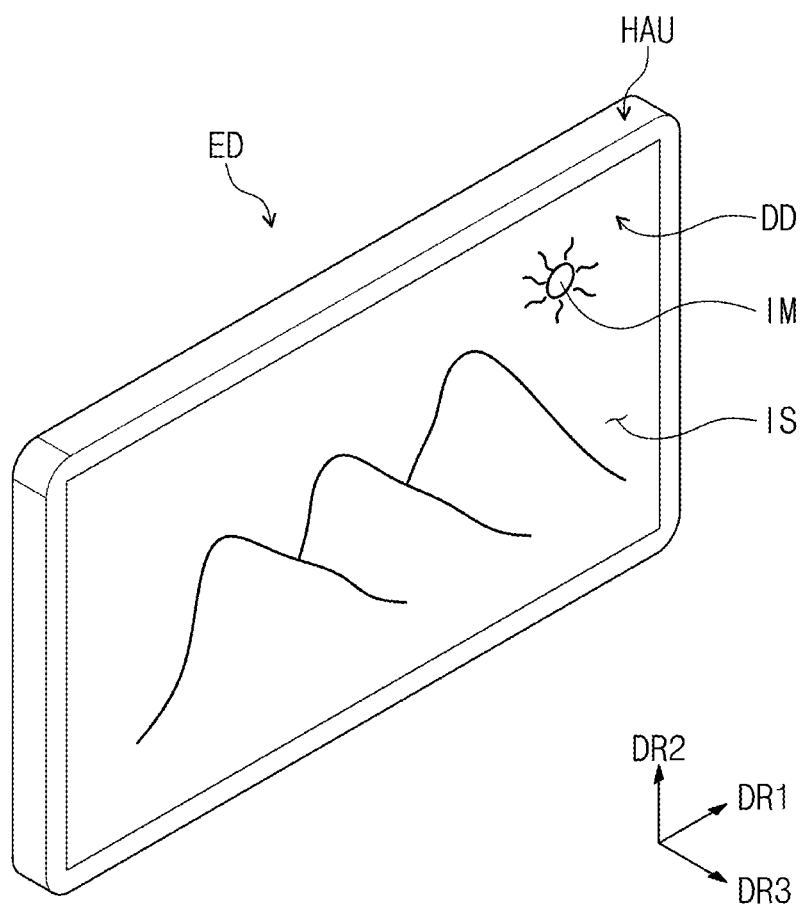
FIG. 1 is a perspective view of an electronic device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element or layer is referred to as being "on", "connected to" or "coupled to" another element or layer, it can be directly on, connected or coupled to the other element or intervening third elements may be present therebetween. In contrast, when an element is referred to as being "directly on", "connected directly to" or "coupled directly to" another element, there are no intervening elements present.

On the other hand, "being directly disposed" may means that there is not an additional layer, film, region, plate or the like between a part of a layer, film, region, plate or the like and another part. For example, "being directly disposed" may mean that disposition of two layers or two members is performed without using an additional member such as an adhesive member therebetween.

Like reference numerals in the drawings refer to like elements. In addition, in the drawings, the thickness, the ratio and the dimension of the element are exaggerated for effective description of the technical contents.

"Or" means "and/or." As used herein, the term "and/or" includes any and all combinations of one or more of the associated items.

Terms such as first, second, and the like may be used to describe various components, but these components should not be limited by the terms. These terms are generally only used to distinguish one element from another. For instance, a first component may be referred to as a second component, or similarly, a second component may be referred to as a first component, without departing from the scope of the present disclosure. As used herein, the singular forms "a," "an," and "the" may be intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. As used herein, the term "disposed on" may refer to not only an upper part of any member but also a lower part thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and the disclosure herein, and will not be interpreted in an idealized or overly formal sense unless expressly so defined herein.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of an optical film and a display device including the optical film according to the invention will be described in detail with reference to the accompanying drawings.

Figure 2:
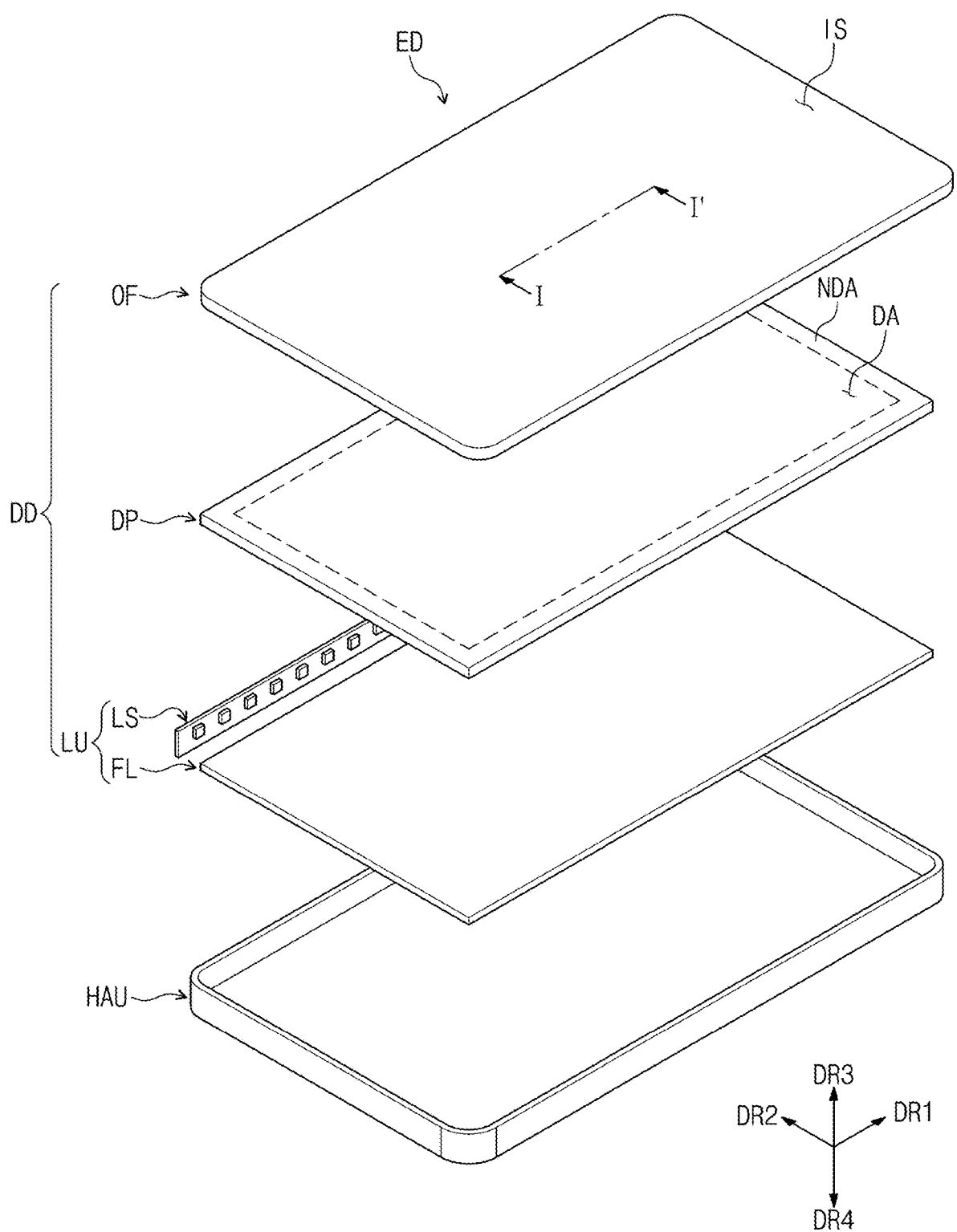
FIG. 2 is an exploded perspective view of the display device illustrated in FIG. 1.
Figure 3:
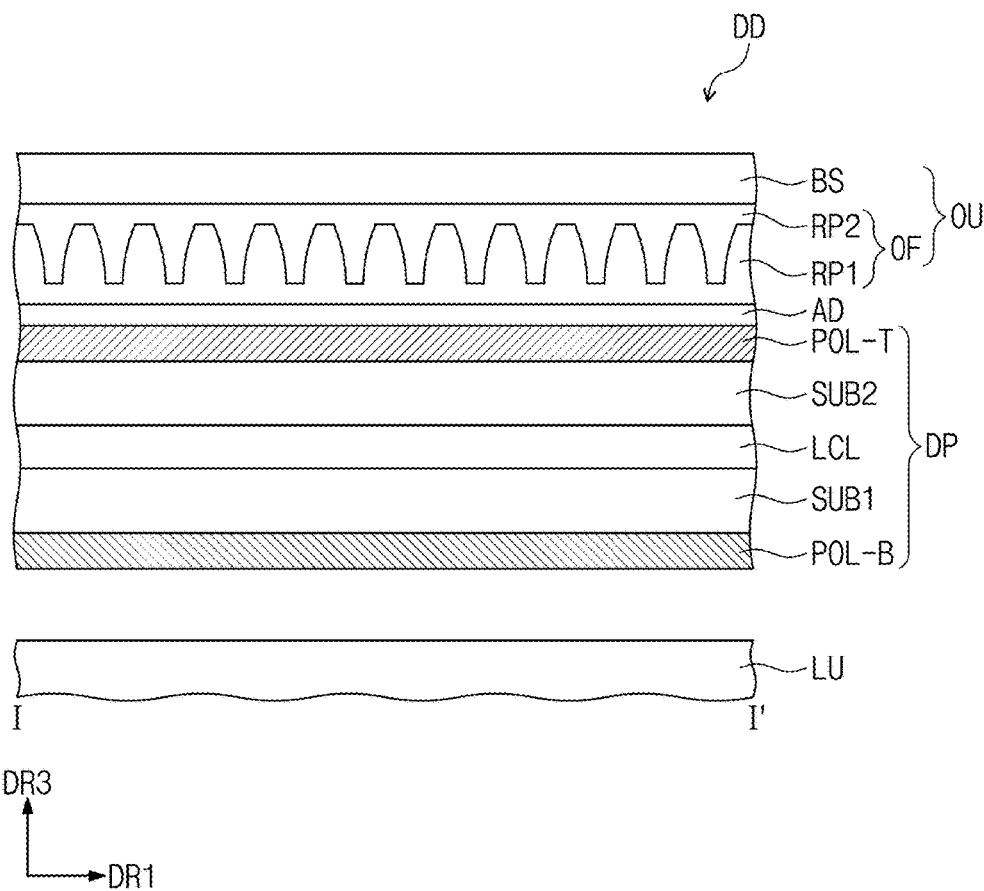
FIG. 3 is a cross-sectional view of a display device according to an embodiment of the invention.
Figure 4:
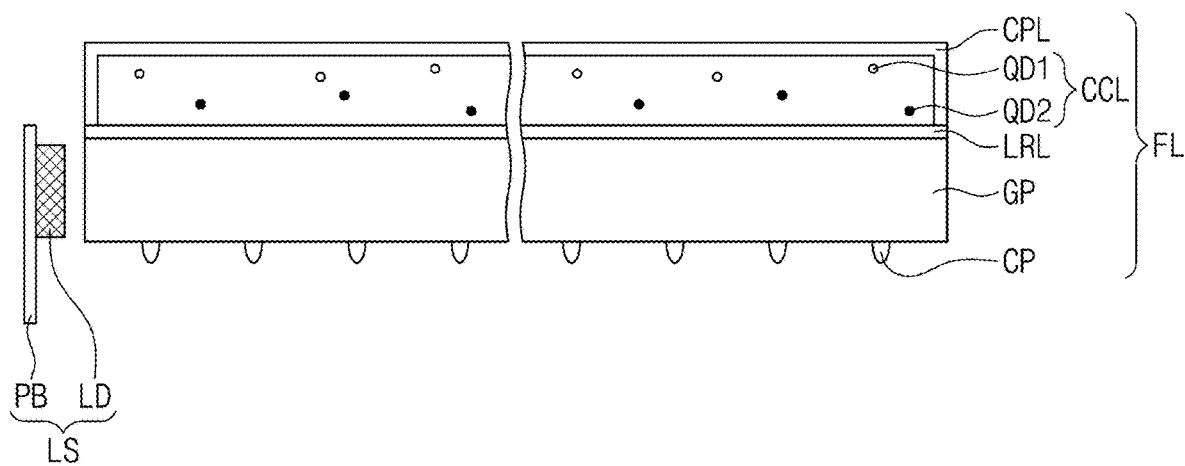
FIG. 4 is a cross-sectional view of a light source member according to an embodiment of the invention.

FIG. 1 is a perspective view showing an electronic device. FIG. 2 is an exploded perspective view of the display device illustrated in FIG. 1. FIG. 3 is a cross-sectional view of a display device according to an embodiment of the invention. More particularly, FIG. 3 is a cross-sectional view take along line I-I' of FIG. 2. FIG. 4 is a cross-sectional view of a light source member according to an embodiment of the invention.

Figure 5:
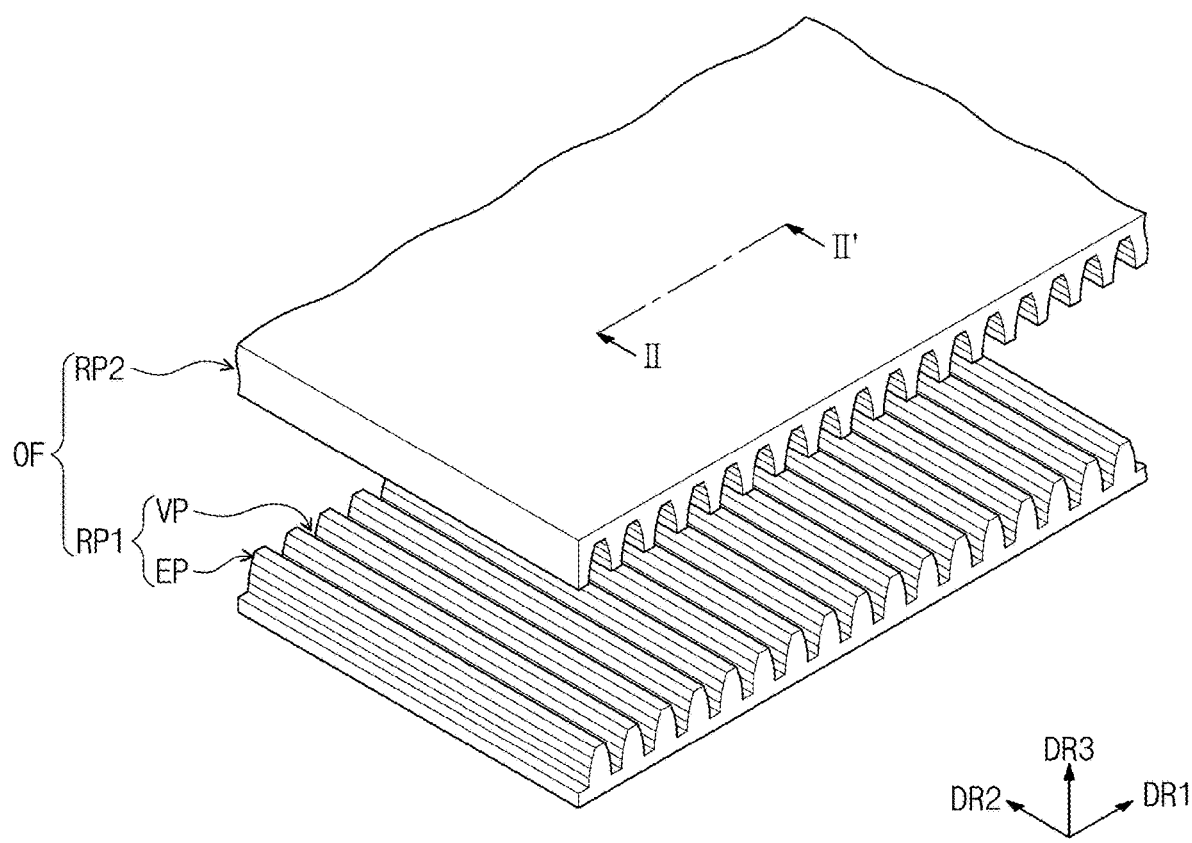
FIG. 5 is an exploded perspective view of an optical film according to an embodiment of the invention.

FIGS. 5 to 10 are drawing for an optical film of an embodiment. FIG. 5 is an exploded perspective view of an optical film according to an embodiment of the invention. FIGS. 6 to 10 are cross-sectional views of a part of an optical film according to an embodiment.

In an embodiment, an electronic device ED may be a large electronic device such as a television, a monitor, and an outdoor billboard. In an alternative embodiment, the electronic device ED may be a small or medium-sized electronic device such as a personal computer, a laptop computer, a personal digital assistant, a vehicle navigator, a game console, a smartphone, a tablet, or a camera, etc. However, these are merely exemplary, and may be adopted in another electronic device without being deviated from the teachings of the invention.

An embodiment of the electronic device ED may include a display device DD and a housing HAU. The electronic device ED may display an image IM through a display surface IS. In an embodiment, as shown in FIG. 1, the display surface IS may be parallel to a surface defined by a first directional axis DR1 and a second directional axis DR2 that intersects with the first directional axis DR1. However, this is merely exemplary, and in an alternative embodiment, the display surface IS of the electronic device ED may have a curved shape, or include a curved surface.

The normal direction of the display surface IS, or a direction in which the image IM is displayed, among the thickness directions of the electronic device ED is indicated by a third directional axis DR3. In addition, an opposite direction to the third directional axis among the thickness directions of the electronic device ED is indicated by a fourth directional axis DR4. A front surface (or top surface) and A rear surface (or bottom surface) of each member is defined based on the third directional axis DR3. However, the directions indicated by the first to fourth directional axes DR1, DR2, DR3, and DR4 are of relative concepts, and may be referred to as other directions.

The housing HAU may receive or accommodate the display device DD. The housing HAU may be disposed to cover the display device DD and to expose a top surface of the display device DD that is the display surface IS of the display device DD. The housing HAU may cover side surfaces and the bottom surface of the display device DD, and expose the entire top surface thereof. However, the embodiment is not limited thereto, and alternatively, the housing HAU may also cover a part of the top surface as well as the side surfaces and the bottom surface of the display device DD.

The display device DD may include a light source member LU, a liquid crystal display panel DP, and an optical member OU. The light source member LU may be disposed under the liquid crystal display panel DP, and the optical member OU may be disposed on the liquid crystal display panel DP.

In an embodiment of the display device, the optical member OU includes an optical film. The optical film OF may be disposed on the liquid crystal panel DP. In an embodiment, as shown in FIG. 3, the optical member OU may include the optical film OF and a base film BS for supporting the optical film OF.

FIG. 4 is a cross-sectional view of the light source member LU according to an embodiment of the invention. In an embodiment, the light source member LU may include a light source LS and functional layers FL for delivering light emitted from the light source LS to the liquid crystal panel DP. The functional layers FL may include a guide panel GP, a low refractive layer LRL disposed on the guide panel GP, and a color conversion layer CCL disposed on the low refractive layer LRL. The light source LS may be disposed on or to face at least one side surface of the guide panel GP. In an embodiment, the light source member LU may further include a barrier layer CPL disposed on the color conversion layer CCL. In an embodiment, a plurality of light output pattern parts CP may be disposed on the bottom surface of the guide panel GP.

In an embodiment, the light source LS in the light source member LU may include a circuit board PB and a plurality of light emitting element packages LD disposed on the circuit board PB. The light emitting element packages LD may emit light in a predetermined wavelength range. Alternatively, the light source LS may include a plurality of light emitting element packages LD for emitting light in different wavelength ranges from each other. In an embodiment, the light emitting element packages LD may emit first light having a central wavelength in a wavelength range of about 440 nanometers (nm) to about 460 nm. In an embodiment, the light emitting element packages LD may emit a blue light.

In an embodiment, as illustrated in FIGS. 2 and 4, the light source LS may be disposed adjacent to a single side surface of the guide panel GP, but the embodiment is not limited thereto. In an alternative embodiment, the light source LS may be additionally disposed adjacent to a plurality of side surfaces of the guide panel GP.

In another alternative embodiment, although not illustrated in the drawings, the light source LS may be disposed on a lower surface of the guide panel GP. In such an embodiment, the light source LS may be provided in a direct type.

In an embodiment, the guide panel GP may be a glass substrate, but the embodiment is not limited thereto. Alternatively, the guide panel GP may be a transparent resin substrate. In an embodiment, the guide panel GP may include acrylic resin, for example.

The light output pattern parts CP disposed on the bottom surface of the guide panel GP may deliver light, which is emitted from the light source and incident to one side surface of the guide panel GP, to another side surface of the guide panel GP, or change a direction of light so that the light incident in a direction of the bottom surface of the guide panel GP is delivered in a direction to a light output surface that is the top surface of the guide panel GP.

The low refractive layer LRL may be disposed on the guide panel GP. The low refractive layer LRL may be disposed directly on the guide panel GP. A refractive index of the low refractive layer LRL may be less than that of the guide panel GP, such that the low refractive layer LRL may enable the light incident to one side surface of the guide panel GP from the light source LS to be effectively delivered to another side surface of the guide panel GP relatively distant from the light source LS. In such an embodiment of the light source member LU, the guide panel GP and the low refractive layer LRL provided on the guide panel GP may function as an optical waveguide plate.

The light source member LU includes the color conversion layer CCL disposed on the low refractive layer LRL. The color conversion layer CCL may change a color of the light provided from the light source LS to deliver the color-changed light to the liquid crystal panel DP. In one embodiment, for example, the light provided from the light source LS may pass through the color conversion layer CCL, thereby being converted to a white light, and then be provided to the liquid crystal display panel DP as the white light. In an embodiment, the color conversion layer CCL may include a plurality of quantum dots QD1 and QD2 for converting the incident light into light in a different wavelength range. In an embodiment, where the light provided from the light source LS is first light in a blue light wavelength range, the color conversion layer CCL may include a first quantum dot Q1 excited by the blue light to emit a green light, and a second quantum dot QD2 excited by the blue light to emit a red light.

The barrier layer CPL may be disposed on the color conversion layer CCL. The barrier layer CPL may prevent moisture and/or oxygen (hereinafter, 'moisture/oxygen') to permeate into the color conversion layer CCL. The barrier layer CPL may cover the color conversion layer CCL.

In an embodiment, as shown in FIG. 3, the liquid crystal display panel DP is disposed on the light source member LU. The liquid crystal display panel DP may include a first substrate SUB1 and a second substrate SUB2, which face each other, and a liquid crystal layer LCL disposed between the first substrate SUB1 and the second substrate SUB2.

In an embodiment, as shown in FIG. 2, the liquid crystal display panel DP may be divided into a display area DA and an edge area NDA surrounding the display area DA. The display area DA is an area on which an image is displayed on a plane, and the edge area NDA is an area adjacent to the display area on the plane and an area on which the image is not displayed. The liquid crystal display panel DP may include a plurality of pixels (not shown) disposed in the display area DA.

A signal line and a pixel circuit of the pixels are provided on any one (hereinafter, an array substrate) of the first substrate SUB1 and the second substrate SUB2. The array substrate may be connected to a main circuit board through a chip on film ("COF") or the like. A central control circuit for driving the liquid crystal display panel DP may be disposed in the main circuit board. The central control circuit may be a microprocessor. A chip of COF may be a data driving circuit. A gate driving circuit may be mounted to the array substrate, or be integrated on the array substrate in a low temperature poly-silicone ("LTPS") type.

The liquid crystal layer LCL includes liquid crystals. In an embodiment, the liquid crystal layer LCL of the liquid crystal display panel DP may include vertically aligned ("VA") liquid crystals. The liquid crystals included in the liquid crystal layer LCL may be vertically aligned with respect to the first substrate SUB1 or the second substrate SUB2. In an embodiment, the liquid crystals may be aligned to have an inclination angle of about 88° to about 90° with respect to a top surface of the first substrate SUB1 or a bottom surface of the second substrate SUB2, for example. In an embodiment of the display device DD, the liquid crystal display panel DP may be a liquid crystal display panel of a VA mode.

However, the embodiment is not limited thereto, and in an alternative embodiment, the liquid crystal display panel DP may be in one of various types of mode such as a twisted nematic ("TN") mode, a horizontally aligned mode, a super vertical alignment ("SVA') mode, a super patterned vertical alignment ("S-PVA") mode, an optically compensated bend ("OCB") mode, or an electrically controlled birefringence ("ECB") mode. In an embodiment, the liquid crystal display panel DP may have a display panel driving method and an alignment manner of the liquid crystal molecules, which are different from the exemplified one.

The liquid crystal display panel DP may include polarization layers POL-T and POL-B. In an embodiment, as shown in FIG. 3, the liquid crystal display panel DP may include a bottom polarization layer POL-B disposed on the bottom of the first substrate SUB1, which is a bottom substrate of the liquid crystal display panel DP, and a top polarization layer POL-T disposed on the top of the second substrate SUB2 that is the top substrate of the liquid crystal display panel DP.

The polarization layers POL-T and POL-B may include linear polarizers. The linear polarizer may linearly polarize provided light in one direction. The liner polarizer may be a film type polarizer including a stretched polymer film. For example, the stretched polymer film may be a stretched polyvinylalcohol film. In addition, the liner polarizer may be a coating type polarization layer.

In addition, unlike the illustrated, the polarization layers POL-T or POL-B may be in-cell type polarization layers respectively independently disposed between the first substrate SUB1 and the liquid crystal layer LCL, and the second substrate SUB2 and the liquid crystal layer LCL.

In one embodiment, for example, the bottom polarization layer POL-B may be a coating type polarization layer or a polarization layer provided by a deposition. In an embodiment, the bottom polarization layer POL-B may be provided by coating with a material including a dichroic dye and a liquid crystal compound. Alternatively, the bottom polarization layer POL-B may be a wire grid type polarization layer. In another alternative embodiment, the bottom polarization layer POL-B may be a film type and be disposed in a lower side of the liquid crystal display panel DP. In such an embodiment, an adhesive layer may be further disposed between the bottom polarization layer POL-B and the liquid crystal display panel DP.

In an embodiment, the top polarization layer POL-T may be a coating type polarization layer or a polarization layer provided by a deposition.

A transmission axis of the linear polarizer included in the top polarization layer POL-T disposed on the top of the second substrate SUB2 may be orthogonal to a transmission axis of the linear polarizer included in the bottom polarization layer POL-B. However, the embodiment is not limited thereto.

In an embodiment, the polarization layers POL-T and POL-B may further include a phase retardation layer, a light compensation layer or the like. The phase retardation layer, the light compensation layer or the like may be disposed on the top surface or the bottom surface of the linear polarizer. In one embodiment, for example, an adhesive layer may be further included between the liner polarizer and the phase retardation layer, or the liner polarizer and the light compensation layer.

In an embodiment of the display device DD, an optical member OU may be further disposed on the top of the liquid crystal display panel DP. The optical member OU may include an optical film OF. In an embodiment, the optical member OU may further include a base film BS provided on the optical film OF.

The optical film OF may be disposed on the top of the liquid crystal panel DP. In an embodiment, the optical film OF may be disposed on the top polarization layer POL-T. In an embodiment, an adhesive layer AD may be disposed between the top polarization layer POL-T and the optical film OF.

The base film BS may be disposed on the optical film OF. The base film BS may function as a support body for supporting the optical film OF or a protection layer for protecting the optical film OF. In on embodiment, for example, the base film BS may be a polyethylene terephthalate film.

In an embodiment, the optical film OF may include a first pattern layer RP1 and a second pattern layer RP2. In an embodiment, the first pattern layer RP1 may be disposed adjacent to the liquid crystal display panel DP, and the second pattern layer RP2 may be disposed on or to cover the first pattern layer RP1.

Referring to FIG. 5, in an embodiment, the first pattern layer RP1 includes a plurality of protruding parts EP, and a concave part VP may be defined between neighboring protruding parts EP. The second pattern layer RP2 may cover the protruding parts EP of the first pattern layer RP1, and be disposed to fill the concave parts VP.

A refractive index of the second pattern layer RP2 may be greater than that of the first pattern layer RP1. In an embodiment, an absolution value of the difference between the refractive indexes of the first pattern layer RP1 and the second pattern layer RP2 may be about 0.1 or greater. In one embodiment, for example, the absolution value of the difference between the refractive indexes of the first pattern layer RP1 and the second pattern layer RP2 may be about 0.12 or greater. In an embodiment of the optical film OF, the refractive index of the first pattern layer RP1 may be in a range of about 1.0 to about 1.47. In such an embodiment, the refractive index of the second pattern layer RP2 may be in a range of about 1.57 to about 1.7. However, the embodiment is not limited thereto, and a refractive index of each pattern layer may be adjusted in various ways within a range in which a refractive index difference between the first pattern layer RP1 and the second pattern layer RP2 is maintained to be about 0.1 or greater.

Figure 6:
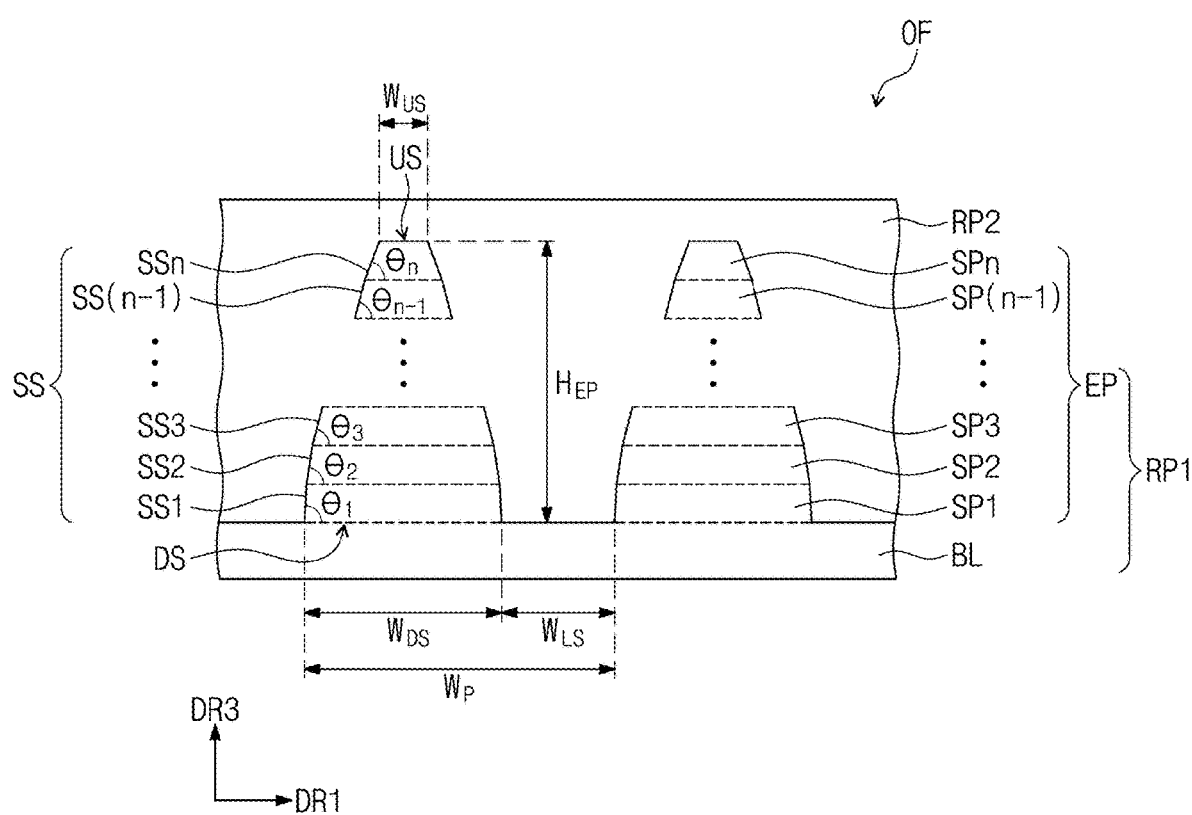
FIG. 6 is a cross-sectional view of a part of an optical film according to an embodiment of the invention.

In an embodiment of the optical film OF, as shown in FIG. 6, the first pattern layer RP1 may include a base part BL and a plurality of protruding parts EP. The protruding parts EP may be arranged and disposed on the base part BL. In an embodiment, the second pattern layer RP2 may be disposed on the first pattern layer RP1 and fill between the first pattern layer RP1 and the second pattern layer RP2.

In an embodiment, each of the protruding parts EP may extend in a predetermined direction. Referring to FIG. 5, each of the protruding parts EP may extend in a direction of a second directional axis DR2. In such an embodiment, the neighboring protruding parts EP may be arranged separately in a first directional axis DR1 that is orthogonal to the second directional axis DR2. In such an embodiment, the protruding parts EP may be arranged to exhibit a stripe pattern on a plane defined by the first directional axis DR1 and the second directional axis DR2.

In an embodiment of the optical film OF, a pitch $W_P$ by which the protruding parts EP are arrayed may be in a range of about 10 micrometers (μm) to about 100 μm. In one embodiment, for example, the pitch $W_P$ by which the protruding parts EP are arrayed may be in a range of about 10 μm to about 50 μm, or may be in a range of about 20 μm to about 40 μm.

Referring to FIGS. 1 to 5, an extension direction of the protruding parts EP of the optical film OF may be parallel to up and down directions or a vertical or horizontal direction when viewed in a direction facing the display surface IS of the electronic device ED. In an embodiment of the display device DD illustrated in FIGS. 1 and 2, the extension direction of the protruding parts EP of the optical film OF may be parallel to the second directional axis DR2 that is parallel to a short side of the display device DD.

In an embodiment, as shown in FIG. 1, the left and right directions (or a horizontal directions) of the display surface IS of the electronic device ED may be a long side direction, and the up and down directions (or a vertical direction) may be a short side direction, but the embodiment is not limited thereto. Alternatively, in a direction in which a user views the electronic device ED, the left and right directions of the display surface IS of the electronic device ED may be a short side direction, and the up and down directions may be a long side direction. In such an embodiment, the extension direction of the protruding parts EP of the optical film OF may be a direction parallel to the long side of the display device DD.

In another alternative embodiment, according to an application environment of the electronic device ED, the extension direction of the protruding parts EP may be parallel to the left and right directions or a horizontal direction when viewed in a direction facing the display surface ID of the electronic device ED.

Referring to FIGS. 6 to 10, in embodiments of the optical film OF, OF-a, and OF-b, each of the protruding parts EP, EP-a or EP-b may include a bottom surface DS adjacent to the base part BL, an upper surface opposite to the bottom surface DS, and side surfaces SS, SS-a, and SS-b disposed between the bottom surface DS and the upper surface US. In the protruding parts EP, EP-a, and EP-b, the upper surface US may be a planar surface parallel to the bottom surface DS. The side surfaces SS, SS-a, and SS-b may connect the bottom surface DS and the upper surface US.

In an embodiment of the optical films OF, OF-a, or OF-b, the side surfaces SS, SS-a, or SS-b may include n sub-inclined surfaces SS1, SS2, SS3, . . . and SSn, or a curved surface SS-a or SS-S2.

In an embodiment of the optical film OF a ratio of the width $W_{US}$ of the upper surface US to the width $W_{DS}$ of the bottom surface DS of the protruding part EP may be in a range of about 0.35 to about 0.50. In other words, the width $W_{US}$ of the upper surface US and the width $W_{DS}$ of the bottom surface DS satisfy the following inequality: $0.35 \le W_{US}/W_{DS} \le 0.50$.

Herein, a width corresponds to a minimum width in a direction parallel to the first directional axis DR1 on a cross-sectional surface, and a height corresponds to a minimum distance in a direction parallel to the third directional axis DR3. Herein, the width indicates a width on a cross-sectional surface vertical to the base part BL, and means a width in the direction vertical to the extension direction of the protruding parts EP.

On the cross-sectional surface vertical to the base part BL, a separation interval $W_P$ between the neighboring protruding parts EP and the width $W_{DS}$ of the bottom surface may satisfy the relation of the following Inequality (1).

$$0.4 W_P \le W_{DS} \le 0.7 \times W_P \qquad (1)$$

In Inequality (1) $W_P$ denotes the separation interval between neighboring protruding parts EP, that is, the pitch of the protruding parts EP. $W_P$ denotes the sum of the width $W_{DS}$ of the bottom surface DS and a minimum distance $W_{LS}$ between the neighboring protruding parts EP. On the other hand, $W_{DS}$ and $W_{LS}$ are both distances in the second direction, which is orthogonal to the first direction that is an extension direction of the protruding parts EP. Referring to FIG. 6, all of $W_P$, $W_{DS}$ and $W_{LS}$ are distances in a direction of the first directional axis DR1.

In one embodiment, for example, the separation interval $W_P$ between the neighboring protruding parts EP and the width $W_{DS}$ of the bottom surface may satisfy the following inequality: $0.5 \times W_P \leq W_{DS} \leq 0.6 \times W_P$. However, the embodiment is not limited thereto.

On a cross-sectional surface vertical to the base part BL, the separation interval $W_P$ between the neighboring protruding parts EP and the height $H_{EP}$ of each of the protruding parts EP may satisfy the relation of the following Inequality (2).

$$H_{EP}/W_P \geq 0.8 \quad (2)$$

In Inequality (2), $W_P$ denotes the sum of the width $W_{DS}$ of the bottom surface DS and the minimum distance $W_{LS}$ between neighboring protruding parts EP. On the other hand, $W_{DS}$ and $W_{LS}$ are both distances in a second direction orthogonal to a first direction that is an extension direction of the protruding parts EP. In Inequality (2), $H_{EP}$ denotes a minimum distance between the bottom surface DS and the upper surface US of a protruding part EP.

In an embodiment of the optical film OF, the height $H_{EP}$ of the protruding parts EP corresponds to about 0.8 times or greater the array interval $W_P$ of the protruding parts EP. However, the height $H_{EP}$ of the protruding parts EP may be adjusted within a range in which a ratio of the width $W_{US}$ of the upper surface US to the width $W_{DS}$ of the bottom surface DS of the protruding parts EP is in a range of about 0.35 to about 0.50.

Figure 7:
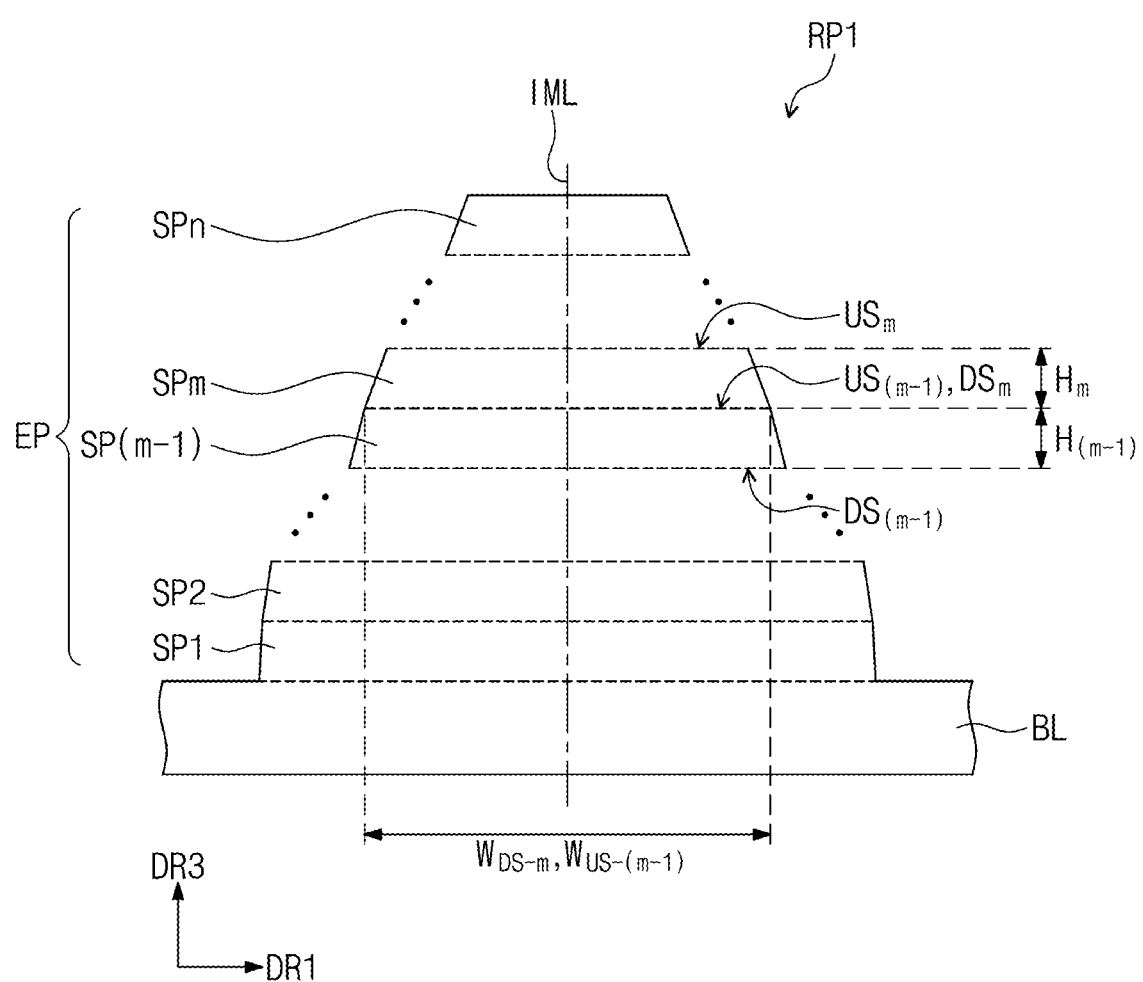
FIG. 7 is a cross-sectional view of a part of a pattern layer of an optical film according to an embodiment of the invention.
Figure 8:
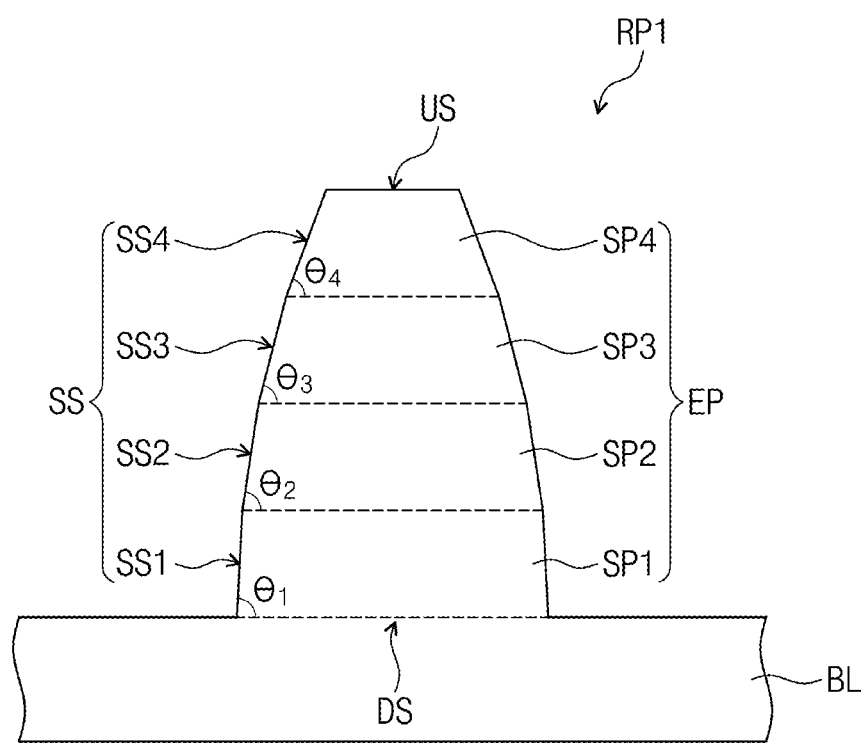
FIG. 8 is a cross-sectional view of a part of a pattern layer of an optical film according to an embodiment of the invention.

Referring to FIGS. 6 to 8, in an embodiment, the side surface SS of the optical film OF includes n sub-inclined surfaces SS1, SS2, SS3, . . . , and SSn, and inclination angles $\theta_1, \theta_2, \theta_3, \ldots,$ and $\theta_n$ of the sub-inclined surfaces SS1, SS2, SS3, . . . , and SSn may be different from each other. Here, the inclination angle corresponds to an acute angle formed by a corresponding one of the sub-inclined surfaces SS1, SS2, SS3, . . . , and SSn with respect to the bottom surface DS. Here, n is an integer of 3 or greater, and each side surface SS of the protruding parts EP in an embodiment of the optical film OF may include three or more sub-inclined surfaces of which inclination angles are different from each other.

In an embodiment of the optical film OF, n may be an integer of 4 or greater. In one embodiment, as shown in FIG. 8, a protruding part EP of the first pattern layer RP1 including four sub-inclined surfaces SS1, SS2, SS3, and SS4 having different inclination angles from each other. In an alternative embodiment, n may be increased to infinity ($\infty$), such that the side surface SS of the protruding part EP may define one curved surface.

Referring to FIGS. 6 to 8, in an embodiment, the protruding parts EP included in the optical film OF may have a polygonal shape on a plane parallel to a plane defined by the first directional axis DR1 and the third directional axis DR3, which is a cross-sectional surface vertical to the base part BL. In one embodiment, for example, on the cross-sectional surface vertical to the base part BL, each of the protruding parts EP may have a polygonal shape defined by two side surfaces SS, each including the bottom surface DS, the upper surface US, and the sub-inclined surfaces SS1, SS2, SS3, . . . , and SSn. Each of the protruding parts EP may have a shape in which one side surface SS includes n sides on the cross-sectional surface vertical to the base part BL.

The lengths of the n sides, which collectively define the one side SS, may be substantially identical to each other. In such an embodiment, the lengths of the sides of the sub-inclined surfaces SS1, SS2, SS3, . . . , and SSn on the cross-sectional surface vertical to the base part BL may be substantially identical to each other.

The inclination angles $\theta_1, \theta_2, \theta_3, \ldots,$ and $\theta_n$ of the n sub-inclined surfaces SS1, SS2, SS3, . . . , and SSn may be reduced, as each of the n sub-inclined surfaces SS1, SS2, SS3, . . . , and SSn becomes farther from the base part BL. In one embodiment, for example, a first inclination angle $\theta_1$ of a first sub-inclines surface SS1 adjacent to the base part BL among then sub-inclined surfaces SS1, SS2, SS3, . . . , and SSn may be greater than a second inclination angle $\theta_2$ of a second sub-inclines surface SS2 separated from the base part BL.

In an embodiment of the optical film OF, the inclination angle $\theta_1$ of the sub-inclines surface SS1 connected to the base part BL among the n sub-inclined surfaces SS1, SS2, SS3, . . . , and SSn may be in a range of about 85 degrees to about 90 degrees. In one embodiment, for example, the inclination angle $\theta_1$ of the sub-inclines surface SS1 connected to the base part BL may be in a range of about 85 degrees to about 88 degrees.

In an embodiment, an inclination angle $\theta_n$ of an n-th sub-inclined surface SSn connected to the base part BL is smaller than an inclination angle $\theta_{n-1}$ of an (n−1)-th sub-inclined surface SS(n−1), and may be about 70 degrees or smaller. In such an embodiment, the inclination angle $\theta_n$ of the n-th sub-inclined surface SSn may be variously adjusted to allow a ratio of the width $W_{US}$ of the upper surface US to the width $W_{DS}$ of the bottom surface DS of the protruding part EP to be in a range of about 0.35 to about 0.50.

In an embodiment of the optical film OF, each of the protruding parts EP may have a symmetric pattern shape. In such an embodiment, the protruding part EP may have a symmetric shape with respect to an imaginary line IML passing through the center of the protruding part EP and extending in a direction of the third directional axis DR3 that is a thickness direction of the optical film OF.

In an embodiment of the optical film OF, where the side surface SS of the protruding part EP includes n different sub-inclined surfaces SS1, SS2, SS3, . . . , and SSn of which inclination angles are different from each other, the protruding part EP may include n sub-protruding parts SP1, SP2, SP3, . . . , and SPn. In such an embodiment, each of the protruding parts EP may include n sub-protruding parts SP1, SP2, SP3, . . . , and SPn. Here, n is an integer of 3 or greater, and the protruding part EP may include 3 or more sub-protruding parts.

In an embodiment, each of the protruding parts EP includes the n sub-protruding parts SP1, SP2, SP3, . . . , and SPn, and the width $W_{DS-m}$ of a sub-bottom surface DSm of an m-th sub-protruding part SPm may be the same as the width $W_{US-(m-1)}$ of a sub-upper surface US(m−1) of an (m−1)-th sub-protruding part SP(m−1). The m may be an integer greater than or equal to 2 and less than or equal to n.

In an embodiment of the optical film OF, a ratio $H_m:H_{(m-1)}$ of the heights of the m-th sub-protruding part SPm and the (m−1)-th sub-protruding part SP(m−1) may be in a range of about 0.8:1 to about 1:1. Each height of the m-th sub-protruding part SPm and the (m−1)-th sub-protruding part SP(m−1) may be a minimum distance between a sub-bottom surface and a sub-upper surface thereof in the third direction DR3.

In an embodiment of the optical film OF, each of then sub-protruding parts SP1, SP2, SP3, . . . , and SPn may have a trapezoidal shape on a cross-sectional surface vertical to the base part BL. The n sub-protruding parts SP1, SP2, SP3, . . . , and SPn may be provided in a sequentially stacked type on the base part BL.

Each of then sub-protruding parts SP1, SP2, SP3, . . . , and SPn may include a bottom surface closer to the base part BL, an upper surface facing the bottom surface, and a side surface for connecting the bottom surface and the upper surface.

The bottom surface of the first sub-protruding part SP1, which is adjacent to the base part BL, among the n sub-protruding parts SP1, SP2, SP3, . . . , and SPn may become the bottom surface DS of the protruding part EP, and the upper surface of the n-th sub-protruding part SPn which is the uppermost part among the n sub-protruding parts SP1, SP2, SP3, . . . , and SPn may be the upper surface US of the protruding part EP.

In an embodiment of an optical film OF where n is four, the separation interval $W_P$ between the neighboring protruding parts EP may be in a range about 20 μm to about 30 μm. In such an embodiment, the separation interval $W_P$ between the neighboring protruding parts EP may be about 27.5 μm, for example. In an embodiment, where the separation interval $W_P$ between the neighboring protruding parts EP is in a range of about 20 μm to about 30 μm, the width $W_{DS}$ of the bottom surface DS may be in a range of about 8 μm to about 21 μm. In an embodiment, the width $W_{DS}$ of the bottom surface DS may be about 16 μm, for example. In an embodiment, where the separation interval $W_P$ between the neighboring protruding parts EP is in a range of about 20 μm to about 30 μm, the height $H_{EP}$ of the protruding part EP may be about 16 μm or greater. In such an embodiment, the height $H_{EP}$ of the protruding part EP may be about 22 μm, for example. In an embodiment, where the width $W_{DS}$ of the bottom surface DS is in a range of about 8 μm to about 21 μm, the width $W_{UD}$ of the upper surface US may be about 2.8 μm to about 10.5 μm. In an embodiment, the differences between inclination angles $\theta_1$, $\theta_2$, $\theta_3$, and $\theta_4$ formed by the bottom surface DS and the sub-inclined surfaces SS1, SS2, SS3, and SS of the four sub-protruding parts SP1, SP2, SP3, and SP4 may be in a range of about 5.5 degrees to about 6 degrees. In other words, each differences $(\theta_1-\theta_2)$, $(\theta_2-\theta_3)$, and $(\theta_3-\theta_4)$ between inclination angles $\theta_1$, $\theta_2$, $\theta_3$, and $\theta_4$ may be in a range of about 5.5 degrees to about 6 degrees. In one embodiment, for example, $\theta_1$ may be about 87.1 degrees, $\theta_2$ may be about 81.4 degrees, $\theta_3$ may be about 75.5 degrees, and $\theta_4$ may be about 69.5 degrees. However, the shape, distances and angles of the protruding part EP described above are merely exemplary when n is four, and the embodiment is not limited thereto.

Figure 9:
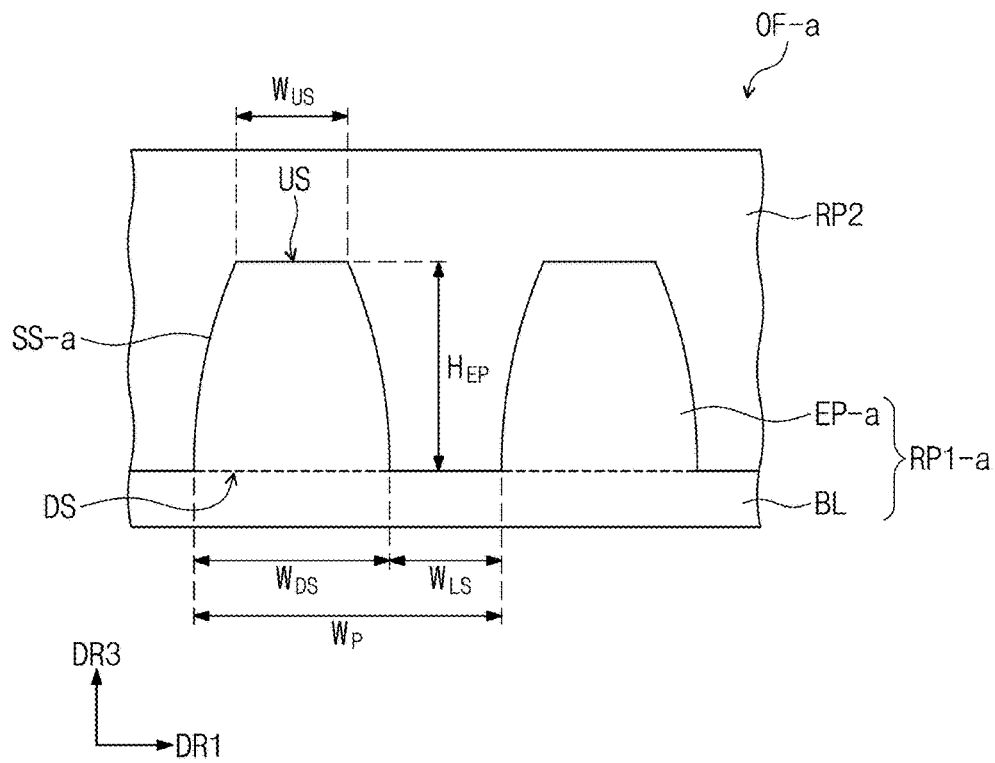
FIG. 9 is a cross-sectional view of a part of an optical film according to an embodiment of the invention.
Figure 10:
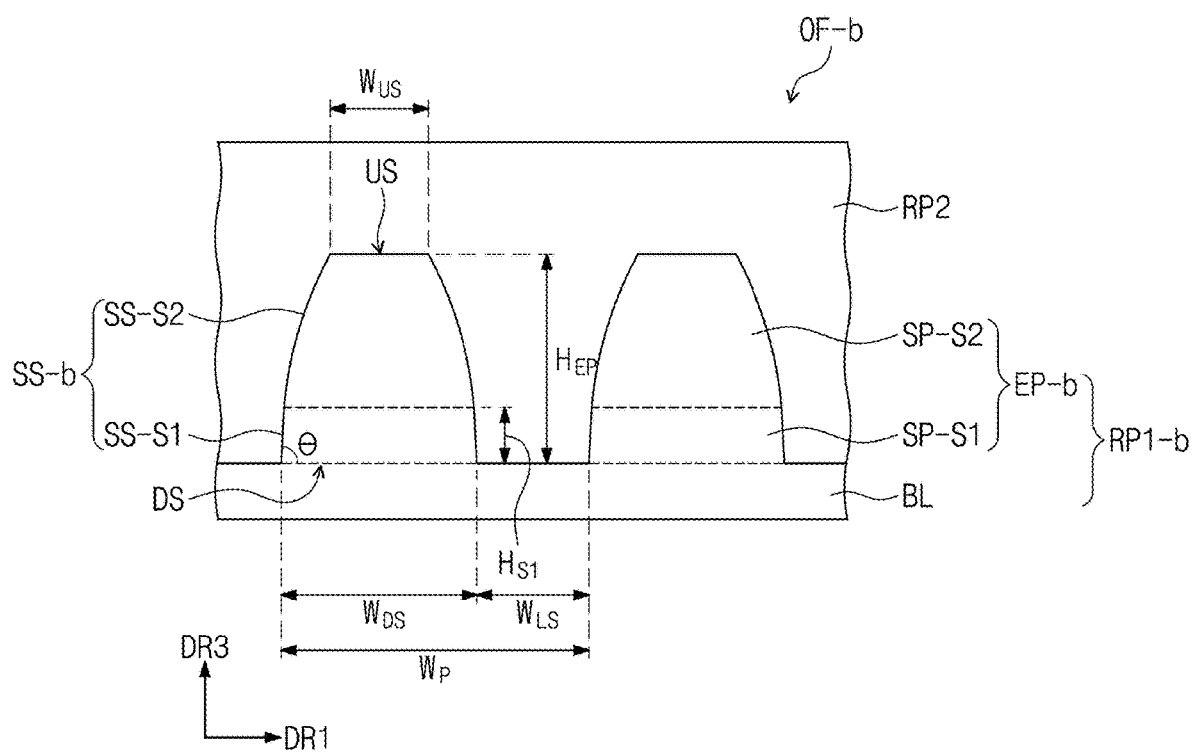
FIG. 10 is a cross-sectional view of a part of an optical film according to an embodiment of the invention.

In an embodiment, the side surfaces of the protruding parts EP-a and EP-b included in the optical films OF-a and OF-b may include a curved surface. FIGS. 9 and 10 shows embodiments of the optical films OF-a and OF-b, where the side surface includes a curved surface.

In an embodiment, as shown in FIG. 9, the optical film OF-a includes a first pattern layer RP1-a and a second pattern layer RP2, and the protruding part EP-a may include a bottom surface DS, an upper surface US, and a side surface SS-a defined by one curved surface. The side surface SS-a may be a curved surface which is convex in a direction of the second pattern layer RP2.

In an alternative embodiment, as shown in FIG. 10, the optical film OF-b includes a first pattern layer RP1-b and a second pattern layer RP2, and the protruding part EP-a may include a bottom surface DS, an upper surface US, and a side surface SS-b including one curved surface. The side surface SS-b may include a lower sub-side surface SS-S1 having an inclination angle in a range of about 85 degrees to about 90 degrees with respect to the bottom surface DS, and a sub-curved surface SS-S2 which is convex in a direction of the second pattern layer RP2. The lower sub-side surface SS-S1 may be connected to the bottom surface DS and the sub-curved surface SS-S2 may be disposed between the sub-side surface SS-S1 and the upper surface US. In such an embodiment of the optical film OF-b, the protruding part EP-b may include a lower sub-protruding part SP-S1 of which side surface has a straight line shape on the cross-sectional surface vertical to the base part BL and an upper sub-protruding part SP-S2 of which side surface has a curved shape.

On a cross-sectional surface vertical to the base part BL, the separation interval $W_P$ between the neighboring protruding parts EP-a or EP-b, and a radius of curvature R of a curved surface, e.g., the side surface SS-a of the protruding part EP-a in the optical film OF-a illustrated in FIG. 9 or the sub-curved surface SS-Sa of the protruding part EP-b in the optical film OF-b illustrated in FIG. 10, may satisfy the following Inequality (3).

$$1.5 \times W_P \leq R \leq 4.0 \times W_P \qquad (3)$$

In Inequality (3), $W_P$ denotes the separation interval between the neighboring protruding parts EP-a or EP-b obtained by adding the width $W_{DS}$ of the bottom surface DS and the minimum distance $W_{LS}$ between the neighboring protruding parts, where $W_{DS}$ and $W_{LS}$ are distances along the second direction orthogonal to the first direction that is an extension direction of the protruding parts, and R denotes the radius of curvature of the curved surface, and R denotes the radius of curvature of the curved surface.

In an embodiment, the radius of curvature R of a curved surface included in the protruding part EP-a or EP-b of the optical film OF-a or OF-b may be in a range of about 40 μm to about 120 μm. In an embodiment, the radius of curvature of the side surface SS-a of the protruding part EP-a, which defines one curved surface in the optical film OF-a illustrated in FIG. 9, or the radius of curvature of a sub-curved surface SS-S2 in the optical film OF-b illustrated in FIG. 10 may be in a range of about 40 μm to about 120 μm. In one embodiment, for example, the radius of curvature R of a curved surface included in the protruding part EP-a or EP-b of the optical film OF-a or OF-b may be in a range of about 40 μm to about 60 μm.

In an embodiment of the optical film OF-b, as illustrated in FIG. 10, a ratio of the height $H_{S1}$ of the lower sub-protruding part SP-S1 to the entire height $H_{EP}$ of the protruding part EP-b in the optical film OF-b may be in a range of about 0.15 to about 0.25.

In embodiments of the optical film OF-a and OF-b described above with reference to FIGS. 9 and 10, the relations of the separation interval $W_P$ between the neighboring protruding parts EP-a and EP-b, a ratio of the widths $W_{DS}$ of the bottom surfaces to the widths $W_{US}$ of the upper surfaces of the protruding parts EP-a and EP-b, a ratio of the separation interval $W_P$ between the protruding parts EP-a and EP-b to the widths $W_{DS}$ of the bottom surfaces of the protruding parts EP-a and EP-b, and the separation interval $W_P$ between the protruding parts EP-a and EP-b and the heights $H_{EP}$ of the protruding parts EP-a and EP-b may be the same as those described above with reference to FIGS. 6 to 8, and any repetitive detailed description thereof will be omitted.

In embodiments of the optical film OF, OF-a and OF-b described above with reference to FIGS. 6 to 10, a refractive index value of the first pattern layer RP1, RP1-a, or RP1-b is less than that of the second pattern layer RP2. In an embodiment of the display device DD, the first pattern layer RP1, RP1-a, or RP1-b may be disposed closer to the liquid crystal display panel DP than the second pattern layer RP2.

An embodiment of an optical film o, in which the side surface of the protruding part included in the pattern layer includes a plurality of sub-inclined surfaces, inclination angles of which are different from each other, or the side surface includes a curved surface, may contribute enhancement in optical characteristics of a display device. In one embodiment, for example, an optical film may effectively prevent a phenomenon in which luminance is varied heterogeneously in a viewing angle in a side surface direction and may contribute the implementation of a display device having improved luminance characteristics. In such an embodiment, a display device may have enhanced viewing angle characteristics by including the optical film a on the liquid crystal display panel.

Figure 11:
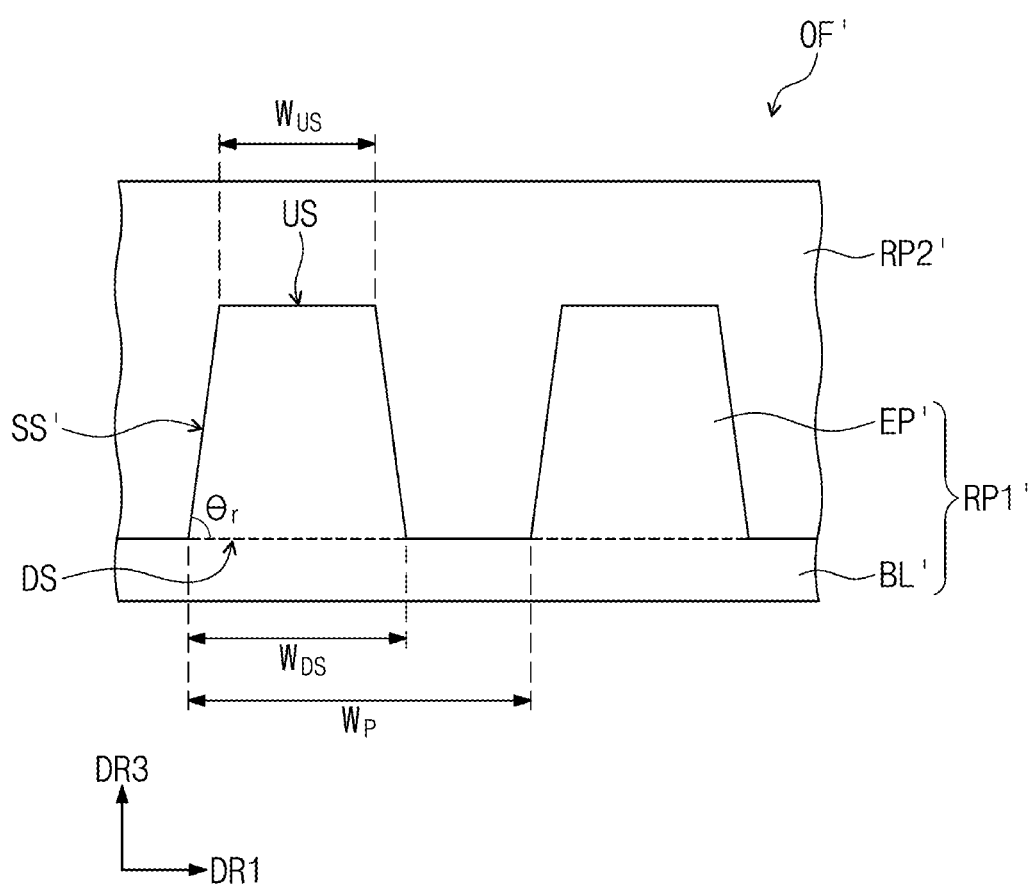
FIG. 11 is a cross-sectional view of a part of an optical film used in a comparative example.

FIG. 11 is a cross-sectional view of a part of an optical film in a comparative example. A comparative example of an optical film OF' includes a first pattern layer RP1' including a protruding part EP' having a trapezoidal shape on a cross-sectional surface that is vertical to a base part BL', and a second pattern layer RP2' disposed on the first pattern layer RP1'. In the comparative example, the optical film OF' has a side surface SS' having a shape different from that of exemplary embodiments of the optical film. In the comparative example, the side surface SS' of the protruding part EP' in the optical film OF' has a flat or a linear shape inclined with a certain inclination angle $\theta_r$ with respect to a bottom surface DS.

Hereinafter, viewing angle characteristic evaluation of the comparative example and the embodiments will be described in detail with reference to FIGS. 12A to 12C, and FIG. 13A to FIG. 13C. In the viewing angle characteristic evaluation of the comparative example and the embodiments, a separation interval $W_P$ between neighboring protruding parts EP', the width $W_{DS}$ of the bottom surface DS, and the width $W_{US}$ of an upper surface US in the comparative exemplar of the optical film OF' and those of the embodiments of the optical film OF are the same as each other. The inclination angel $\theta_r$ of the side surface SS' in the comparative example is about 87.1 degrees.

FIGS. 12A to 12C and FIGS. 13A to 13C show the evaluation results of viewing angle characteristics for the display device including an embodiment of the optical film according to the invention and the comparative example of the display device.

Figure 12A:
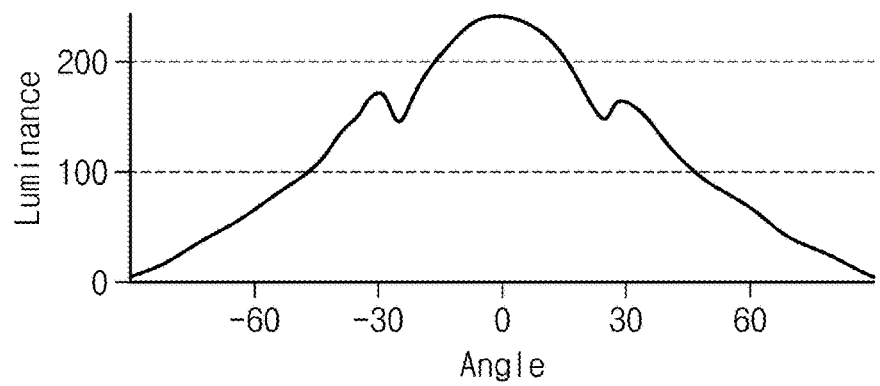
FIG. 12A is a graph showing a viewing angle characteristic evaluation result in a display device according to a comparative example, which uses the optical film of FIG. 11.
Figure 12B:
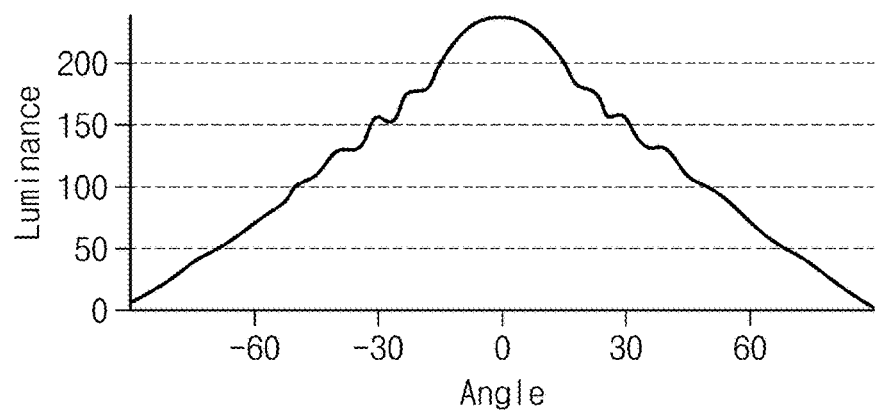
FIGS. 12B and 12C are graphs respectively showing viewing angle characteristic evaluation results in display devices according to embodiments of the invention.
Figure 12C:
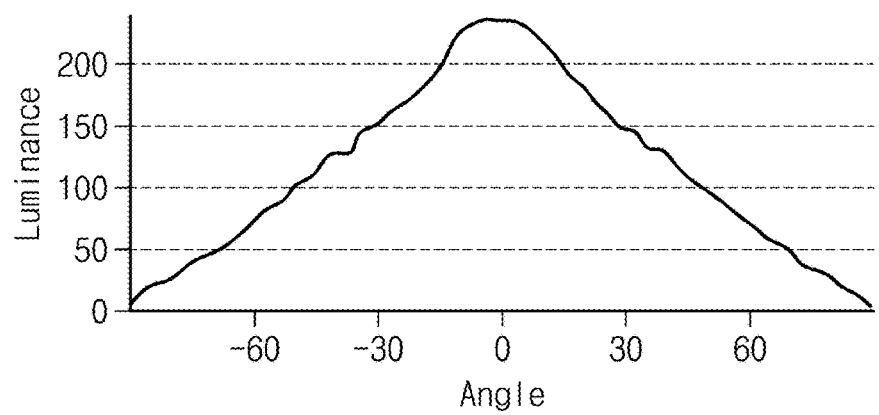

FIG. 12A shows the luminance characteristic evaluation result according to the viewing angle for the display device including the comparative example of the optical film illustrated in FIG. 11. FIG. 12B shows the luminance characteristic evaluation result of a display device including an embodiment of an optical film in which n is 3, that is, the side surface includes three sub-surfaces having different inclination angles from each other. FIG. 12C shows the luminance characteristic evaluation result of a display device including an embodiment of an optical film in which n is 4, that is, the side surface includes four sub-surfaces having different inclination angles. In the evaluation, the remaining configurations other than the optical films are identically provided in the comparative example and the embodiments.

Referring to FIGS. 12A to 12C, a luminance heterogeneousness issue in the lateral viewing angle is improved in the embodiments when compared with the comparative example. As shown in FIG. 12A, in the comparative example, the luminance change characteristics appear relatively great in the viewing angle directions of about 30 degrees in the left and right with respect to the front direction of about 0 degree, while, in the embodiments in FIGS. 12B and 12C, a luminance change amount is relatively reduced in the viewing angle direction of about 30 degrees and luminance homogeneousness increases. Accordingly, in the display device including an embodiment of the optical film having the configuration described above with respect to FIGS. 6 to 8, lateral display quality may be improved than that in the comparative example.

Figure 13A:
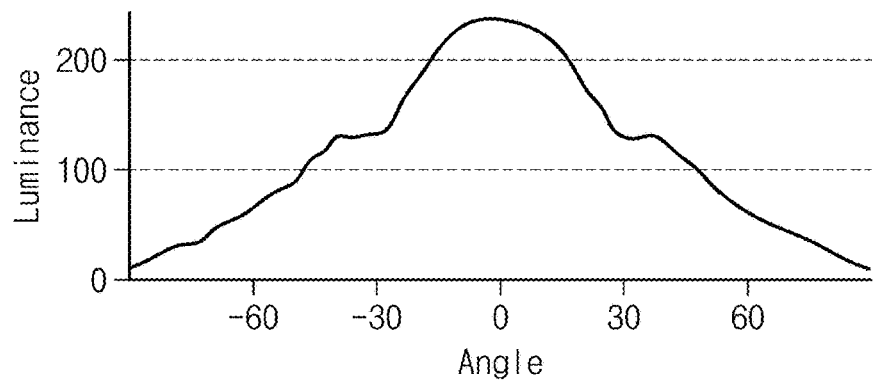
FIG. 13A is a graph showing a viewing angle characteristic evaluation result in a display device according to a comparative example.
Figure 13B:
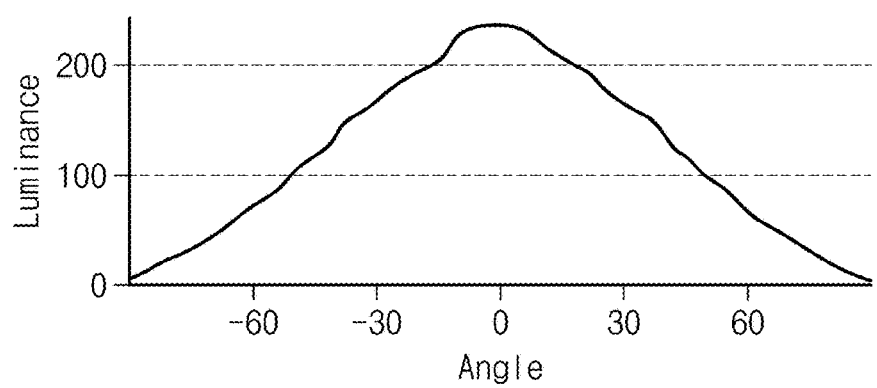
FIGS. 13B and 13C are graphs respectively showing viewing angle characteristic evaluation results in display devices according to embodiments of the invention.
Figure 13C:
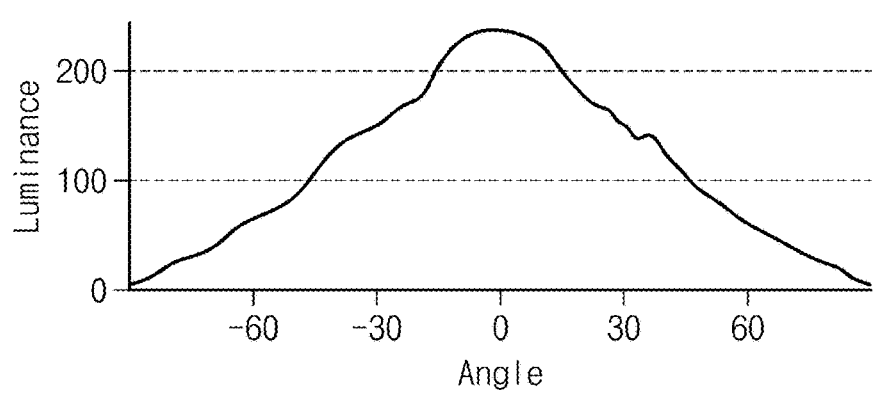

FIGS. 13A to 13C show the optical characteristic evaluation results for the display device in the comparative example and the embodiments, where the side surface of the protruding part included in the optical film has a curved surface shape. FIG. 13A shows a comparative example where the relation of the separation interval between the neighboring protruding parts and a radius of curvature of a side surface the protruding parts does not satisfy Inequality (3) described above. The optical film used in the comparative example shown in FIG. 13A corresponds to a case where a side surface of the protruding parts is curved with the radius of curvature eight times the separation interval $W_P$ between the neighboring protruding parts. FIG. 13B corresponds to a case in which a side surface of the protruding parts is curved with the radius of curvature double the separation interval $W_P$ between the neighboring protruding parts, and FIG. 13C corresponds to a case a side surface of the protruding parts is curved with the radius of curvature four times the separation interval $W_P$ between the neighboring protruding parts In comparison with the comparative example in FIG. 12A, the embodiments of FIGS. 13B and 13C have improved optical characteristics in the viewing angle direction. In addition, the embodiments of FIGS. 13B and 13C have improved optical characteristics in the viewing angle direction in comparison with the comparative example of FIG. 13A.

Accordingly, in the display device including an embodiment of the optical film having a configuration described above with respect to FIGS. 9 to 10, the lateral display quality may be improved when compared with that of the comparative example.

In an embodiment of the invention, as described above, an optical film may include protruding parts having side surfaces including a plurality of sub-inclined surfaces, or includes protruding parts having side surfaces including a curved surface, such that lateral viewing angle characteristics of a display device including the optical film may be improved by widening a direction in which light incident into the optical film is dispersed and by preventing a phenomenon that light emitted at a particular angle is concentrated.

Figure 14:
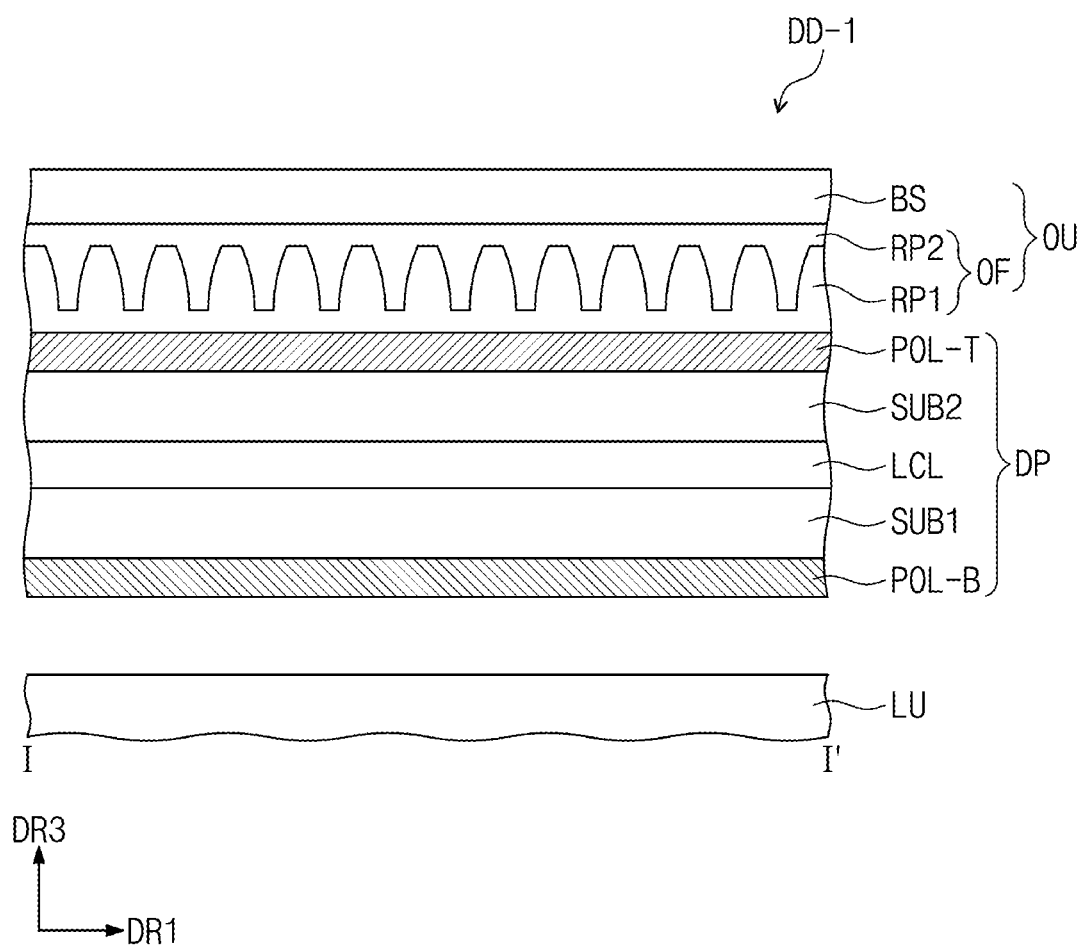
FIG. 14 is a cross-sectional view of a display device according to an alternative embodiment of the invention.

FIG. 14 is a cross-sectional view of a display device according to an alternative embodiment of the invention.

An embodiment of the display device in FIG. 14 is substantially the same as the embodiments of the display device shown in FIGS. 1 to 3 except that adhesive layer AD is omitted. The same or like elements shown in FIG. 14 have been labeled with the same reference characters as used above to describe the embodiments of the display device shown in FIGS. 1 to 3, and any repetitive detailed description thereof will hereinafter be omitted or simplified.

In an embodiment, as shown in FIG. 14, the display device DD-1 may include a light source member LU disposed under the liquid crystal display panel DP, and an optical member OU disposed on the liquid crystal display panel DP and including the optical film OF.

In such an embodiment, the optical film OF in the display device DD-1 includes the first pattern layer RP1 and the second pattern layer RP2. The difference between the refractive index of the first pattern layer RP1 and the refractive index of the second pattern layer RP2 may be greater than about 0.1. The refractive index of the first pattern layer RP1 is less than that of the second pattern layer RP2, and the first pattern layer RP1 may be disposed closer to the liquid crystal display panel DP.

In such an embodiment, the optical film OF in the display device DD-1 is substantially the same as those described above with reference to FIGS. 3 and 5 to 10, and any repetitive detailed description thereof will be omitted.

In such an embodiment, the first pattern layer RP1 in the optical film OF may function as an adhesive layer. The first pattern layer RP1 may function as an adhesive member for combining the polarization layer POL-T of the liquid crystal display panel DP and the optical member OU, which are neighboring each other. In one embodiment, for example, the first pattern layer RP1 may be an optical clear adhesive layer.

In such an embodiment, the optical film OF in the display device DD-1 may be directly disposed on the liquid crystal display panel DP. In such an embodiment, an adhesive layer AD between the liquid crystal display panel DP and the optical member OU may be omitted.

In an embodiment, although not illustrated in the drawings, the optical member OU may further include an organic layer (not shown) between the optical film OF and the base film BS. The organic layer (not shown) may be disposed between the second pattern layer RP2 and the base film BS, and may be a primer layer used for increasing adhesion of the optical film OF for the base film BS. A refractive index value of the organic layer (not shown) is not limited, and may be the same as that of the first pattern layer RP1 or the second pattern layer RP2. However, the embodiment is not limited thereto.

In embodiments of the invention, the display device may include an optical film having two pattern layers having different refractive indexes from each other and disposed on the liquid crystal display panel, such that the display device is allowed to have improved viewing angle characteristics and luminance characteristics.

In embodiments of the invention, the optical film includes protruding parts, each having a side surface defined by a plurality of sub-inclined surfaces in an optical pattern layer, or includes protruding parts, each having a side surface including a curved surface, and thus an optical dispersion effect is increased in the side surface of the protruding part. Accordingly, in such embodiment, the display device may have improved display quality. In embodiments of the invention, the optical film includes protruding parts in which a separation interval of neighboring protruding parts, the number of sub-inclined surfaces defining a side surface of the protruding part, inclination angles of sub-inclined surfaces, the radius of curvature in a case where the side surface includes a curved surface, and the sizes of the protruding parts are adjusted or determined in various ways as described herein, and thus the display device may have improved display quality.

An embodiment may provide an optical film through which the display quality of a display device may be improved by including a pattern layer in which the shape of a protruding part is optimized.

An embodiment may provide a display device of which display quality is improved in a lateral viewing angle direction by including an optical film in which side shapes, the sizes and a disposition interval, etc., of protruding parts in a pattern layer are optimized.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. An optical film comprising:
    a first pattern layer comprising a base part and a plurality of protruding parts disposed on the base part, wherein the first pattern layer has a first refractive index; and
    a second pattern layer disposed on the first pattern layer, wherein the second pattern layer has a second refractive index greater than the first refractive index,
    wherein each of the protruding parts comprises:
        a bottom surface adjacent to the base part;
        an upper surface opposite to the bottom surface and parallel to the bottom surface; and
    a side surface disposed between the bottom surface and the upper surface,
    wherein the side surface comprises n sub-inclined surfaces, inclination angles of which are different from each other, or comprises a curved surface which is convex in a direction of the second pattern layer,
    each of the inclination angles of the n sub-inclined surfaces is an acute angle thereof with respect to the bottom surface, and
    n is an integer of 3 or greater,
    wherein
    each of the protruding parts comprises n sub-protruding parts,
    a width of a sub-bottom surface of an m-th sub-protruding part is identical to a width of a sub-upper surface of an (m−1)-th sub-protruding part, and
    m is an integer greater than or equal to 2 and less than or equal to n.

2. The optical film of claim 1, wherein a first inclination angle of a first sub-inclined surface adjacent to the base part among the n sub-inclined surfaces is greater than a second inclination angle of a second sub-inclined surface which is more distant from the base part than the first sub-inclined surface is.

3. The optical film of claim 1, wherein an inclination angle of a sub-inclined surface connected to the base part among the n sub-inclined surfaces is in a range of about 85 degrees to about 90 degrees.

4. The optical film of claim 1, wherein, on a cross-sectional surface vertical to the base part, a ratio of a width of the upper surface to a width of the bottom surface is in a range of about 0.35 to about 0.50.

5. The optical film of claim 1, wherein
    each of the protruding parts extends in a first direction, and
    the protruding parts are arrayed to be spaced apart from each other in a second direction which is orthogonal to the first direction.

6. The optical film of claim 5, wherein a pitch of the protruding parts is in a range of about 10 μm to about 100 μm.

7. The optical film of claim 5, wherein, on a cross-sectional surface vertical to the base part, a separation interval of neighboring protruding parts and a width of the bottom surface satisfy the following inequality:

$$0.4 \times W_P \leq W_{DS} \leq 0.7 \times W_P,$$

wherein $W_{DS}$ denotes the width of the bottom surface, and $W_P$ denotes the separation interval obtained by adding the width of the bottom surface and a minimum distance between the neighboring protruding parts, which are distances in the second direction.

8. The optical film of claim 5, wherein, on a cross-sectional surface vertical to the base part, a separation interval of neighboring protruding parts and a height of each of the protruding parts satisfy the following inequality:

$$H_{EP}/W_P \geq 0.8,$$

wherein $W_p$ denotes the separation interval obtained by adding a width of the bottom surface and a minimum distance between the neighboring protruding parts, which are distances in the second direction, and $H_{EP}$ denotes the height which is a minimum distance between the bottom surface and the upper surface.

9. The optical film of claim 5, wherein, on a cross-sectional surface vertical to the base part, a separation interval of neighboring protruding parts and a radius of curvature of the curved surface satisfy the following inequality:

$$1.5 \times W_P \leq R \leq 4.0 \times W_P,$$

wherein $W_p$ denotes the separation interval obtained by adding a width of the bottom surface and a minimum distance between the neighboring protruding parts, which are distances in the second direction, and R denotes the radius of curvature of the curved surface.

10. The optical film of claim 1, wherein, on a cross-sectional surface vertical to the base part, lengths of inclined sides of the n sub-inclined surfaces are identical to each other.

11. The optical film of claim 1, wherein a difference between the first refractive index and the second refractive index is about 0.1 or greater.

12. The optical film of claim 1, wherein
a ratio of a height of the m-th sub-protruding part to a height the (m−1)-th sub-protruding part is in a range of about 0.8:1 to about 1:1, and
each of the height of the m-th sub-protruding part and the height of the (m−1)-th sub-protruding part is a minimum distance between a sub-bottom surface and a sub-upper surface thereof.

13. The optical film of claim 1, wherein the curved surface has a radius of curvature in a range of about 40 μm to about 120 μm.

14. The optical film of claim 1, wherein the side surface comprises:
a lower sub-side surface connected to the bottom surface and having an inclination angle in a range of about 85 degrees to about 90 degrees with respect to the bottom surface; and
a sub-curved surface disposed between the lower sub-side surface and the upper surface, where the sub-curved surface is convex in a direction of the second pattern layer.

15. An optical film comprising:
a first pattern layer comprising a base part and a plurality of protruding parts disposed on the base part, wherein the first pattern layer has a first refractive index; and
a second pattern layer disposed on the first pattern layer, wherein the second pattern layer has a second refractive index greater than the first refractive index, wherein each of the protruding parts comprises:
a bottom surface adjacent to the base part;
an upper surface opposite to the bottom surface and parallel to the bottom surface; and
a side surface disposed between the bottom surface and the upper surface,
wherein the side surface comprises n sub-inclined surfaces, inclination angles of which are different from each other, or comprises a curved surface which is convex in a direction of the second pattern layer,
each of the inclination angles of the n sub-inclined surfaces is an acute angle thereof with respect to the bottom surface, and
n is an integer of 3 or greater 1,
wherein
the side surface comprises the n sub-inclined surfaces having different inclination angles from each other,
each of the protruding parts comprises n sub-protruding parts, and
on a cross-section vertical to the base part, each of the n sub-protruding parts has a trapezoidal shape.

16. An optical film comprising:
a first pattern layer comprising a base part and a plurality of protruding parts disposed on the base part, wherein the first pattern layer has a first refractive index; and
a second pattern layer disposed on the first pattern layer, wherein the second pattern layer has a second refractive index greater than the first refractive index,
wherein each of the protruding parts comprises:
a bottom surface adjacent to the base part;
an upper surface disposed opposite to the bottom surface and parallel to the bottom surface; and
a side surface disposed between the bottom surface and the upper surface,
wherein the side surface comprises n sub-inclined surfaces, inclination angles of which are different from each other, or is a curved surface which is convex in a direction of the second pattern layer,
each of the inclination angles of the n sub-inclined surfaces is an acute angle thereof with respect to the bottom surface,
n is an integer of 3 or greater, and,
on a cross-section vertical to the base part, a ratio of a width of the upper surface to a width of the bottom surface is in a range of about 0.35 to about 0.5,
wherein
each of the protruding parts comprises n sub-protruding parts,
a width of a sub-bottom surface of an m-th sub-protruding part is identical to a width of a sub-upper surface of an (m−1)-th sub-protruding part, and
m is an integer greater than or equal to 2 and less than or equal to n.

17. The optical film of claim 16, wherein each of the protruding parts has a stripe shape extending in a predetermined direction.

18. The optical film of claim 16, wherein an inclination angle of a sub-inclined surface connected to the base part among the n sub-inclined surfaces is in a range of about 85 degrees to about 90 degrees.

19. The optical film of claim 16, wherein, on a cross-sectional surface vertical to the base part, a separation interval between neighboring protruding parts and the width of the bottom surface satisfy the following inequality:

$$0.4 \times W_P \leq W_{DS} \leq 0.7 \times W_P,$$

wherein $W_{DS}$ denotes the width of the bottom surface, and
$W_p$ denotes the separation interval obtained by adding the width of the bottom surface and a minimum distance between the neighboring protruding parts, which are distances in a direction orthogonal to an extending direction of the protruding parts.

20. The optical film of claim 16, wherein, on a cross-sectional surface vertical to the base part, a separation interval of neighboring protruding parts and a radius of curvature of the curved surface satisfy the following inequality:

$$1.5 \times W_P \leq R \leq 4.0 \times W_P,$$

wherein $W_p$ denotes the separation interval obtained by adding the width of the bottom surface and a minimum distance between the neighboring protruding parts, which are distances in a direction orthogonal to an extending direction of the protruding parts, and R denotes the radius of curvature of the curved surface.

21. The optical film of claim 16, wherein, on a cross-sectional surface vertical to the base part, each of the protruding parts has a shape symmetric to an imaginary line passing through a center and extending in a thickness direction.

22. The optical film of claim 16, wherein, on a cross-sectional surface vertical to the base part, the inclination angles of the n sub-inclined surfaces decrease, as the n sub-inclined surfaces become more distant from the base part.

23. A display device comprising:
a liquid crystal display panel; and
an optical film disposed on an upper surface of the liquid crystal display panel,
wherein the optical film comprises:
a first pattern layer comprising a base part and a plurality of protruding parts disposed on the base part, wherein the first pattern layer has a first refractive index; and
a second pattern layer disposed on the first pattern layer, where the second pattern layer has a second refractive index greater than the first refractive index,
wherein each of the protruding parts comprises:
a bottom surface adjacent to the base part;
an upper surface opposite to the bottom surface and parallel to the bottom surface; and
a side surface disposed between the bottom surface and the upper surface,
wherein the side surface comprises n sub-inclined surfaces, inclination angles of which are different from each other, or comprises a curved surface which is convex in a direction of the second pattern layer,
each of the inclination angles of the n sub-inclined surfaces is an acute angle thereof with respect to the bottom surface, and n is an integer of 3 or greater,
wherein
each of the protruding parts comprises n sub-protruding parts,
a width of a sub-bottom surface of an m-th sub-protruding part is identical to a width of a sub-upper surface of an (m−1)-th sub-protruding part, and
m is an integer greater than or equal to 2 and less than or equal to n.

24. The optical film of claim 23, wherein a first inclination angle of a first sub-inclined surface adjacent to the base part among the n sub-inclined surfaces is greater than a second inclination angle of a second sub-inclined surface which is more distant from the base part than the first sub-inclined surface is.

25. The optical film of claim 23, wherein an inclination angle of a sub-inclined surface connected to the base part among the n sub-inclined surfaces is in a range of about 85 degrees to about 90 degrees.

26. The optical film of claim 23, wherein, on a cross-sectional surface vertical to the base part, a ratio of a width of the upper surface to a width of the bottom surface is in a range of about 0.35 to about 0.5.

27. The optical film of claim 23, wherein, on a cross-sectional surface vertical to the base part, a separation interval between neighboring protruding parts among the protruding parts and a width of the bottom surface satisfy the following inequality:

$$0.4 \times W_P \leq W_{DS} \leq 0.7 \times W_P,$$

wherein $W_{DS}$ denotes the width of the bottom surface, and
$W_p$ denotes the separation interval obtained by adding the width of the bottom surface and a minimum distance between the neighboring protruding parts, which are distances in a direction orthogonal to an extending direction of the protruding parts.

28. The optical film of claim 23, wherein, on a cross-sectional surface vertical to the base part, a separation interval between neighboring protruding parts among the protruding parts and a radius of curvature of the curved surface satisfy the following inequality:

$$1.5 \times W_P \leq R \leq 4.0 \times W_P,$$

wherein $W_p$ denotes the separation interval obtained by adding the width $W_{DS}$ of the bottom surface and a minimum distance between the neighboring protruding parts, which are distances in a direction orthogonal to an extending direction of the protruding parts, and
R denotes the radius of curvature of the curved surface.

* * * * *